US009100582B2

(12) United States Patent
Aoki

(10) Patent No.: US 9,100,582 B2
(45) Date of Patent: Aug. 4, 2015

(54) IMAGE CAPTURING METHOD AND IMAGE CAPTURING APPARATUS FOR ILLUMINATING SUBJECT

(71) Applicant: FUJITSU LIMITED, Kawasaki-shi, Kanagwa (JP)

(72) Inventor: Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 21 days.

(21) Appl. No.: 14/108,589

(22) Filed: Dec. 17, 2013

(65) Prior Publication Data

US 2014/0211036 A1 Jul. 31, 2014

(30) Foreign Application Priority Data

Jan. 25, 2013 (JP) ................................ 2013-012688

(51) Int. Cl.
*H04N 5/235* (2006.01)
*H04N 5/217* (2011.01)

(52) U.S. Cl.
CPC ............ *H04N 5/2354* (2013.01); *H04N 5/217* (2013.01)

(58) Field of Classification Search
None
See application file for complete search history.

(56) References Cited

U.S. PATENT DOCUMENTS 7,315,324 B2 * 1/2008 Cleveland et al. ......... 348/208.4
2008/0079842 A1 * 4/2008 Aoki et al. .................... 348/366
2014/0125864 A1 * 5/2014 Rihn et al. .................... 348/367

FOREIGN PATENT DOCUMENTS

JP 2003-187230 A 7/2003
JP 2007-25758 A 2/2007
JP 2008-90412 A 4/2008

OTHER PUBLICATIONS

Korean Office Action mailed Mar. 20, 2015 for corresponding Korean Patent Application No. 10-2013-160050 with English Translation, 8 pages.

* cited by examiner

*Primary Examiner* — Albert Cutler
(74) *Attorney, Agent, or Firm* — Fujitsu Patent Center

(57) ABSTRACT

An image capturing method includes: continuously generating, using a processor, one or more OFF images in which the subject is captured with the illumination turned OFF, for a first number of times; continuously generating, using the processor, ON images in which the subject is captured with the illumination turned ON, for a second number of times; continuously generating, using the processor, one or more OFF images in which the subject is captured with the illumination turned OFF, for the first number of times; computing, using the processor, a difference image between each of the generated ON images and the OFF image corresponding to the ON image among the generated OFF images; and integrating, using the processor, the computed difference images.

14 Claims, 17 Drawing Sheets

E'
E
OFF OFF NULL ON ON ON ON NULL OFF OFF
TIME
T0 T1 T2 T3 T4 T5 T6 T7 T8 T9 T10
a1 a2 b1 b2 b3 b4 a3 a4

| OUTPUT CURRENT | DIVISOR N |
|---|---|
| TO 10mA | 0 |
| 11mA TO 20mA | 1 |
| 21mA TO 30mA | 2 |
| 31mA TO 40mA | 4 |

IMAGE CAPTURING METHOD AND IMAGE CAPTURING APPARATUS FOR ILLUMINATING SUBJECT

CROSS-REFERENCE TO RELATED APPLICATION

This application is based upon and claims the benefit of priority of the prior Japanese Patent Application No. 2013-012688, filed on Jan. 25, 2013, the entire contents of which are incorporated herein by reference.

FIELD

The embodiments discussed herein are related to an image capturing method, an image capturing apparatus, and an image capturing program.

BACKGROUND

Various authentication technologies such as biometric authentication or gesture authentication have been known. In the biometric authentication, for example, there are cases where the authentication rate declines because the similarity between two images declines when the intensities of external light differs between capturing a registered image and capturing a matching image. Disclosed as an example of a technology for reducing the influence of external light is an image processing method for acquiring a difference between an OFF image captured during an OFF state in which the illumination is turned OFF and an ON image captured during an ON state in which the illumination is turned ON. The image processing method aims to acquire an image that does not include external light but illumination light by computing the difference between an OFF image captured with only the external light and an ON image captured with the external light and illumination light.

However, when the external light is strong, the pixel values for the portion illuminated with the external light within the area captured by the camera saturate at the upper boundary, and a phenomenon called saturation is thus produced in which such a portion becomes completely white. Therefore, when the difference between the OFF image and the ON image is simply acquired, the authentication ratio may remain low because the characteristics of the region to be biometrically authenticated are lost due to the saturation.

As an example of a technology for solving saturation, Japanese Laid-open Patent Publication No. 2008-90412, for example, discloses an image generating method for dividing an image capturing process into sub-steps based on the intensities of external light, alternately capturing OFF images and ON images, and integrating differences between respective pairs of the OFF image and ON image. This image generating method aims to acquire an image in which the influence of saturation is reduced by reducing the length of the exposure time during capturing of the images to reduce the amount of incident light and by integrating the captured difference images.

However, such a technology has a disadvantage that the time for capturing images is extended as explained below.

To explain, in the image generation method mentioned above, OFF images and ON images are captured alternatingly. When OFF images and ON images are captured alternatingly, the illumination is switched every time an OFF image or an ON image is to be captured. In other words, the illumination is switched from ON to OFF every time an OFF image is to be captured, and the illumination is switched from OFF to ON every time an ON image is to be captured. Because images captured during the process of switching the illumination are captured without the illumination not completely turned OFF or completely turned ON, and such images could be a cause for reducing authentication accuracy, it is preferable not to use the images in the authentication. Because capturing operation is withheld until the illumination is switched OFF or ON every time an OFF image or an ON image is to be captured, the image capturing time is extended.

SUMMARY

According to an aspect of an embodiment, an image capturing method is executed by an image capturing apparatus including an illumination that illuminates a subject. The image capturing method includes: continuously generating, using a processor, one or more OFF images in which the subject is captured with the illumination turned OFF, for a first number of times; continuously generating, using the processor, ON images in which the subject is captured with the illumination turned ON, for a second number of times; continuously generating, using the processor, one or more OFF images in which the subject is captured with the illumination turned OFF, for the first number of times; computing, using the processor, a difference image between each of the generated ON images and the OFF image corresponding to the ON image among the generated OFF images; and integrating, using the processor, the computed difference images.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The embodiments are not intended to limit the technology according to the invention in any way. These embodiments may also be combined in any way within an extent not making any process contradictory.

[a] First Embodiment

Figure 1:
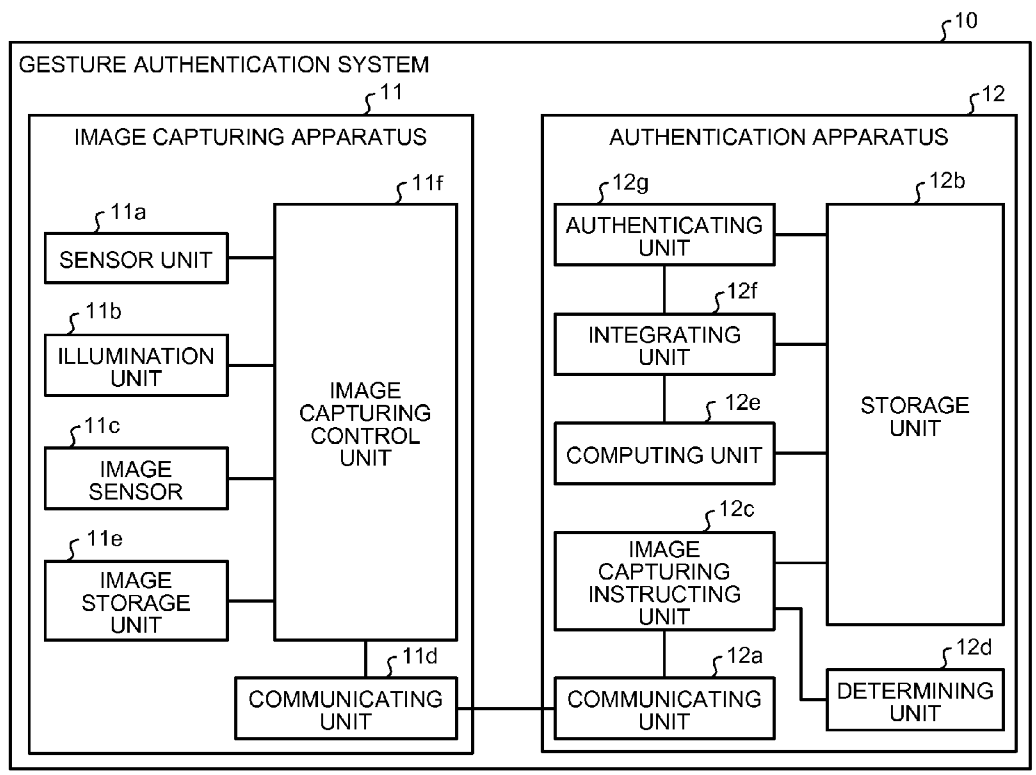
FIG. 1 is a block diagram illustrating functional configurations of apparatuses included in a gesture authentication system according to a first embodiment of the present invention.

FIG. 1 is a block diagram illustrating functional configurations of apparatuses included in a gesture authentication system according to a first embodiment of the present invention. This gesture authentication system 10 authenticates a gesture such as a bodily gesture or a hand gesture of a person, by using a difference image between an OFF image captured during an OFF state in which the illumination is turned OFF and an ON image captured during an ON state in which the illumination is turned ON. In the first embodiment, it is assumed that, as an example, the result of a gesture authentication output from an authentication apparatus 12 is used in operating a channel of a television receiver not illustrated. Alternatively, the gesture authentication result may be used as a human-machine interface of a personal computer or the like.

As illustrated in FIG. 1, the gesture authentication system 10 includes an image capturing apparatus 11 and the authentication apparatus 12. Illustrated in FIG. 1 is an example in which the image capturing apparatus 11 is provided in singularity to the gesture authentication system 10. Alternatively, the image capturing apparatus 11 may be provided in plurality.

Configuration of Image Capturing Apparatus 11

To begin with, a functional configuration of the image capturing apparatus 11 according to the first embodiment will be explained. As illustrated in FIG. 1, the image capturing apparatus 11 includes a sensor unit 11*a*, an illumination unit 11*b*, an image sensor 11*c*, a communicating unit 11*d*, an image storage unit 11*e*, and an image capturing control unit 11*f*. The image capturing apparatus 11 may also include various functional units provided to a camera, such as an optical lens or an optical filter, in addition to the functional units illustrated in FIG. 1.

Among these functional units, the sensor unit 11*a* is a device for detecting a user of the television receiver. As a possible implementation of the sensor unit 11*a*, a human detection sensor that detects a person with visible light, infrared, ultrasonic waves, or temperature may be used. The sensor unit 11*a* monitors, for example, a predetermined viewing area, e.g., an area within a radius of 5 meters, from the display surface of the television receiver. When the sensor unit 11*a* detects a user in the viewing area of the television receiver, the sensor unit 11*a* notifies the image capturing control unit 11*f*, which will be described later, of the position of the user in the viewing area.

The illumination unit 11*b* is a light source that emits illuminating light. As a possible implementation of the illumination unit 11*b*, a light emitting diode (LED) emitting visible light, as well as light sources emitting near infrared or infrared, may be used. The illumination unit 11*b* is installed at a position capable of illuminating an authenticated region such as a hand of the user who is in the viewing area that is detected by the sensor unit 11*a*, for example. When the illumination unit 11*b* has directivity, the illumination unit 11*b* may also be provided with a mechanical unit for allowing the direction in which the illuminating light is output to be adjusted depending on the position of the user in the viewing area.

The image sensor 11*c* is a sensor that converts the light incident from a lens not illustrated into an electric signal. As a possible implementation of the image sensor 11*c*, a charge coupled device (CCD) or a complementary metal oxide semiconductor (CMOS) may be used. The image sensor 11*c* is installed at a position allowing the authenticated region such as a hand of the user in the viewing area detected by the sensor unit 11*a* to be imaged, for example. The image sensor 11*c* may also be provided with a mechanical unit for adjusting the angular field of the image capturing apparatus 11 depending on the position where the user is present in the viewing area so that the authenticated region of the user can be imaged on the image sensor 11*c*. An image captured by the image sensor 11*c* is stored in the image storage unit 11*e* by the image capturing control unit 11*f* which will be explained later.

The communicating unit 11*d* is a processing unit that transmits and receives data to and from other apparatuses including the authentication apparatus 12. As a possible implementation, the communicating unit 11*d* transmits a notification indicating that a user is detected or an image stored in the image storage unit 11*e* to the authentication apparatus 12, and receives an image capturing instruction from the authentication apparatus 12. The communicating unit 11*d* may be connected to a communicating unit 12*a* included in the authentication apparatus 12 over a wire, such as a connector or a cabled local area network (LAN), or wirelessly, e.g., over the Bluetooth (registered trademark), infrared communication, or a wireless LAN.

The image storage unit 11*e* is a storage device storing therein images. As an example, the image storage unit 11*e* stores therein an image captured by the image capturing control unit 11*f*. As another example, the image storage unit 11*e* is accessed when an image stored in the image storage unit 11*e* is read before such an image is transferred to the authentication apparatus 12. An image stored in the image storage unit 11*e* may be deleted after the image is transmitted to the authentication apparatus 12.

The image capturing control unit 11*f* is a processing unit that controls the illumination unit 11*b* and the image sensor 11*c* to allow an image of a subject to be captured. As a possible implementation, the image capturing control unit 11*f* notifies the authentication apparatus 12 that a user is detected when the sensor unit 11*a* detects a user in the viewing area. When the authentication apparatus 12 receives a notification of a user being detected, the image capturing control unit 11*f* receives an image capturing instruction from the authentication apparatus 12, as a response to such a notification. The "image capturing instruction" herein includes image capturing parameters related to an "OFF image" captured in an OFF state in which the illumination is turned OFF, and to an "ON image" captured in an ON state in which the illumination is turned ON. An example of the image capturing parameters includes an exposure time E for which the image sensor 11*c* is exposed to light that is imaged through the lens not illustrated, and a divisor N by which the exposure time E is divided. When such an image capturing instruction is received, the image capturing control unit 11*f* computes a unit exposure time E' representing an exposure time for a single piece of image, by dividing the exposure time E by the divisor N included in the image capturing instruction. After computing the unit exposure time E', the image capturing control unit 11*f* captures N pieces of OFF image and N pieces of ON image.

The image capturing control unit 11*f* captures the OFF images by turning OFF the illumination unit 11*b* before and after capturing N pieces of ON images. For example, after turning OFF the illumination unit 11*b* and capturing N/2 pieces of OFF images, the image capturing control unit 11*f* turns ON the illumination unit 11*b* and captures N pieces of ON images. The image capturing control unit 11*f* then turns OFF the illumination unit 11*b* again, and captures N/2 pieces of OFF images.

Figure 2:
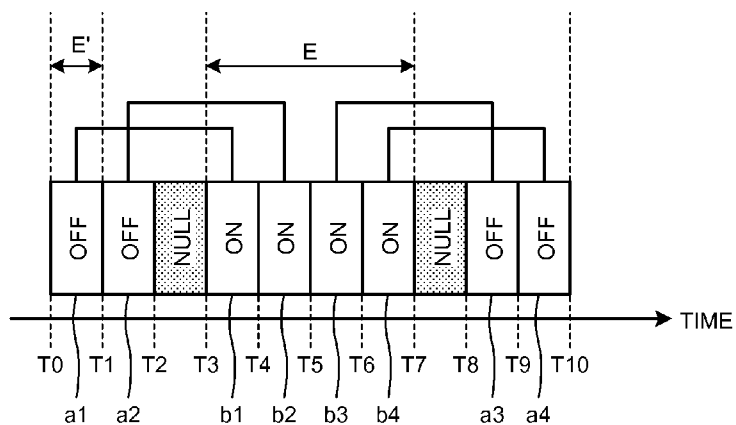
FIG. 2 is a schematic of an example of an image capturing sequence.

FIG. 2 is a schematic of an image capturing sequence. Illustrated as an example in FIG. 2 is an image capturing sequence in an example when the divisor N is "4". As illustrated in FIG. 2, the image capturing control unit 11*f* keeps the illumination unit 11*b* OFF for a period from time T0 to time T2, and closes the shutter temporarily at time T1. The image capturing control unit 11*f* then causes the image storage unit 11*e* to store therein an OFF image a1 acquired through the exposure over a period "T0 to T1", and to store therein an OFF image a2 acquired through the exposure over a period "T1 to T2". The image capturing control unit 11*f* then switches the illumination unit 11*b* from OFF to ON at time T2. Because completely switching the illumination unit 11*b* from OFF to ON takes a certain length of time, the image capturing control unit 11*f* performs null write to the image storage unit 11*e* for an image acquired through the exposure over a period "T2 to T3", assuming that switching from OFF to ON takes time from time T2 to time T3. Such null write is performed because any image acquired before switching to ON or OFF is completed is not used in the authentication.

The image capturing control unit 11*f* keeps the illumination unit 11*b* ON for a period from time T3 to time T6, and closes the shutter temporarily at time T4, time T5, and time T6. As a result, an ON image b1 acquired through the exposure over a period "T3 to T4", an ON image b2 acquired through the exposure over a period "T4 to T5", an ON image b3 acquired through the exposure over a period "T5 to T6", and an ON image b4 acquired through the exposure over a period "T6 to T7" are stored in the order listed herein in the image storage unit 11*e*. The image capturing control unit 11*f* then switches the illumination unit 11*b* from ON to OFF at time T7. The image capturing control unit 11*f* performs null write to the image storage unit 11*e* for an image acquired through the exposure over a period "T7 to T8". The image capturing control unit 11*f* then keeps the illumination unit 11*b* OFF for a period from time T8 to time T10, and closes the shutter temporarily at time T9 and time T10. In this manner, the image capturing control unit 11*f* stores an ON image a4 acquired through the exposure over a period "T9 to T10" in the image storage unit 11*e*, after storing an ON image a3 acquired through the exposure over a period "T8 to T9" in the image storage unit 11*e*.

The OFF images and the ON images stored in the image storage unit 11*e* are sequentially read by the image capturing control unit 11*f*, and transmitted to the authentication apparatus 12 via the communicating unit 11*d*. These OFF images and the ON images may be assigned with identification information such as a frame number in an ascending or descending order of the sequence in which these images are captured, when these images are stored in the image storage unit 11*e* or when these images are transmitted to the authentication apparatus 12.

Figure 3:
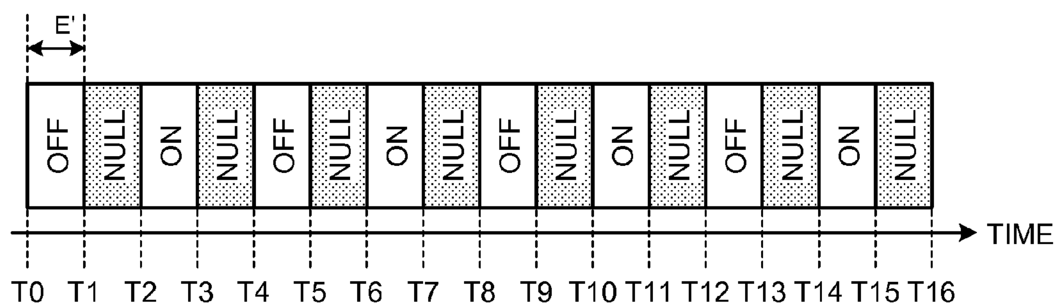
FIG. 3 is a schematic of another example of the image capturing sequence.

By turning OFF the illumination unit 11*b* and capturing N/2 OFF images before and after N ON images are captured, the time and the number of times for null write can be reduced. FIG. 3 is a schematic of an example of an image capturing sequence. Illustrated in FIG. 3 is a sequence in which four OFF images and four ON images are captured alternatingly. As illustrated in FIG. 3, when OFF images and ON images are captured alternatingly, null write is performed for images for a period "T1 to T2", a period "T3 to T4 ", a period "T5 to T6", and a period "T1 to T8", as well as for images for a period "T9 to T10", a period "T11 to T12", period "T13 to T14", and a period "T15 to T16". In other words, when OFF images and ON images are captured alternatingly, null write is performed eight times in total. When the illumination unit 11*b* is turned OFF before and after N pieces of ON images are captured and then N/2 pieces of OFF images are captured, null write is made only twice. Because the image capturing apparatus 11 according to the first embodiment can reduce the time and the number of times for null write, idle time for capturing images can be reduced.

As the image capturing control unit 11*f*, various types of integrated circuits or electronic circuits may be used. An example of an integrated circuit includes an application specific integrated circuit (ASIC). Examples of an electronic circuit include a central processing unit (CPU) and a microprocessing unit (MPU).

As the image storage unit 11*e*, a semiconductor memory device or a storage device may be used. Examples of the semiconductor memory device include a video random access memory (VRAM), a random access memory (RAM), and a flash memory. Examples of the storage device include storage devices such as a hard disk or an optical disk.

Configuration of Authentication Apparatus 12

A functional configuration of the authentication apparatus 12 according to the first embodiment will now be explained. As illustrated in FIG. 1, the authentication apparatus 12 includes the communicating unit 12*a*, a storage unit 12*b*, an image capturing instructing unit 12*c*, a determining unit 12*d*, a computing unit 12*e*, an integrating unit 12*f*, and an authenticating unit 12*g*.

Among these units, the communicating unit 12*a* is a processing unit that transmits and receives data to and from other apparatuses including the image capturing apparatus 11. As a possible implementation, the communicating unit 12*a* receives a notification indicating that a user is detected, OFF images, and ON images from the image capturing apparatus 11, and transmits an image capturing instruction. The communicating unit 12*a* may be connected to the communicating unit 11*d* in the image capturing apparatus 11 over a wire, such as a connector or a cabled LAN, or wirelessly, e.g., over the Bluetooth (registered trademark), infrared communication, or a wireless LAN.

The storage unit 12*b* is a storage device storing therein various types of information. As a possible implementation, the storage unit 12*b* stores therein OFF images, ON images, a difference image representing a difference between an OFF image and an ON image, an integrated image in which difference images are integrated, and a gesture pattern image that is matched against the integrated image. As an example, when OFF images or ON images are received from the image capturing apparatus 11, the storage unit 12*b* stores therein the OFF images or the ON images. As another example, when a difference between an OFF image and an ON image is computed, the storage unit 12*b* stores therein the difference image. As still another example, the storage unit 12*b* stores therein an integrated image in which a plurality of difference images are integrated. As another example, when a gesture authentication is to be executed, the storage unit 12*b* is accessed by the authenticating unit 12*g*, which will be described later, so as to allow a reference to an integrated image and a gesture pattern image against which the integrated image is matched.

The image capturing instructing unit 12*c* is a processing unit that gives an image capturing instruction to the image capturing apparatus 11. As a possible implementation, when a notification indicating that a user is in the viewing area is received from the sensor unit 11*a* in the image capturing apparatus 11, the image capturing instructing unit 12*c* causes the determining unit 12*d*, which will be described later, to determine a divisor N, which is to be included in the image capturing parameters. The image capturing instructing unit 12*c* then transmits an image capturing instruction containing the image capturing parameters including the divisor N determined by the determining unit 12*d* and the exposure time E to the image capturing apparatus 11. The image capturing instructing unit 12*c* then stores OFF images and ON images received from the image capturing apparatus 11 in the storage unit 12*b*. When N pieces of OFF images and N pieces of ON images are stored in the storage unit 12*b*, the image capturing instructing unit 12*c* gives an instruction for computing a difference image to the computing unit 12*e*, which will be described later.

The determining unit 12*d* is a processing unit that determines the divisor N based on the intensity of external light. As a possible implementation, the determining unit 12*d* sets an initial value $N_0$ that is preferably applied in an environment without any external light to the divisor N, and sets the unit exposure time E' to E/N that is computed from the exposure time E and the divisor N, before causing the image capturing apparatus 11 to capture a predetermined number of ON images. Because the ON images thus captured by the image capturing apparatus 11 are used for establishing the divisor N, the number of ON images thus captured does not necessarily need to be in plurality, as long as least one ON image is captured. Furthermore, because it is intended herein to explore the optimal divisor by setting the initial divisor small and gradually increasing the divisor, it is assumed herein that "1" is set to the initial value $N_0$, as an example. However, it is also possible to explore the optimal divisor by initially setting a divisor expected to be the largest, and by gradually reducing the divisor.

After causing the image capturing apparatus 11 to capture the ON images, the determining unit 12*d* computes an external light evaluation value Ex, serving as an index for the intensity of external light, from the ON images. As examples of the method for computing the external light evaluation value Ex, various calculations may be used depending on characteristics or the like used in the authentication. For example, a small area C may be set at the center of the ON image, and a ratio of pixels with saturation with respect to the small area C may be computed as the external light evaluation value Ex. The optimal size or the position of the small area C varies depending on the subject assumed or how the subject is illuminated. For example, the small area C is established correspondingly to an environment in which the images are captured, e.g., considering whether such images are captured in a condition resulting in the highest luminance at the center of the image or in a condition resulting in a high luminance in a specific area of the image. Furthermore, an average luminance, a maximum luminance, a minimum luminance, a median luminance, or a most frequent luminance may be used as an index, instead of the saturation pixel ratio serving as the index.

The determining unit 12*d* then determines if the external light evaluation value Lx is lower than a predetermined threshold Th. If the external light evaluation value is lower than the predetermined threshold, it can be assumed that saturation is not likely to be produced on images when the images are captured based on the unit exposure time E'. In such a case, the determining unit 12*d* determines the divisor N used previously as the divisor N. If the external light evaluation value Ex is equal to or higher than the predetermined threshold Th, it can be assumed that saturation is likely to be produced on ON images when the images are captured with the unit exposure time E'. In such a case, the determining unit 12*d* updates the divisor N to a value larger than the previous value, e.g., a value twice the previous divisor. The determining unit 12*d* repeats the process of updating the divisor, setting a unit exposure time E', and computing the external light evaluation value Ex, until the external light evaluation value Ex reaches a value lower than the threshold Th. The divisor N thus determined is output to the image capturing instructing unit 12*c*.

The computing unit 12*e* is a processing unit that computes a difference image using an OFF image and an ON image stored in the storage unit 12*b*. As a possible implementation, when an instruction for computing a difference image is received from the image capturing instructing unit 12*c*, the computing unit 12*e* reads N pieces of OFF images and N pieces of ON images stored in the storage unit 12*b*. The computing unit 12*e* then determines N pairs of an OFF image and an ON image from the OFF images and the N pieces of ON images read from the storage unit 12*b*. It is preferable for such images to be paired into N pairs in a manner so that the sum of differences between the time at which the OFF images are captured and the time at which the respective ON images are captured becomes the smallest. For example, the computing unit 12*e* pairs an OFF image and an ON image each of which is captured at the earliest timing, among the N pieces of OFF images and the N pieces of ON images. The computing unit 12*e* then computes the difference between the pixel values in the OFF image and the respective pixel values in the ON image in each of these pairs. In this manner, the computing unit 12*e* computes N pieces of difference images. The computing unit 12*e* then stores the N pieces of difference images in the storage unit 12*b*.

To explain using the example illustrated in FIG. 2, the computing unit 12*e* establishes four pairs by pairing the OFF image a2 and the ON image b2, pairing the OFF image a2 and the ON image b2, pairing the OFF image a3 and the ON image b3, and pairing the OFF image a4 and the ON image b4. The computing unit 12*e* then computes a difference image ab1 by computing pixel value differences between the pixels in the OFF image a1 and those in the ON image b1. In the same manner, the computing unit 12*e* computes a difference image ab2 from the OFF image a2 and the ON image b2, computes a difference image ab3 from the OFF image a3 and the ON image b3, and computes a difference image ab4 from the OFF image a4 and the ON image b4. By computing the difference images ab1 to ab4 in the manner described above, the difference in time between when the ON image is captured and when the OFF image is captured can be kept to two unit exposure times E' at a maximum.

When used is the image capturing sequence in which the illumination unit 11*b* is turned OFF and N/2 pieces of OFF images are captured before and after N pieces of ON images are captured, the influence of time-dependent variations in the position of the subject or the intensity of external light can be reduced, compared with when another image capturing sequence is used.

Figure 4:
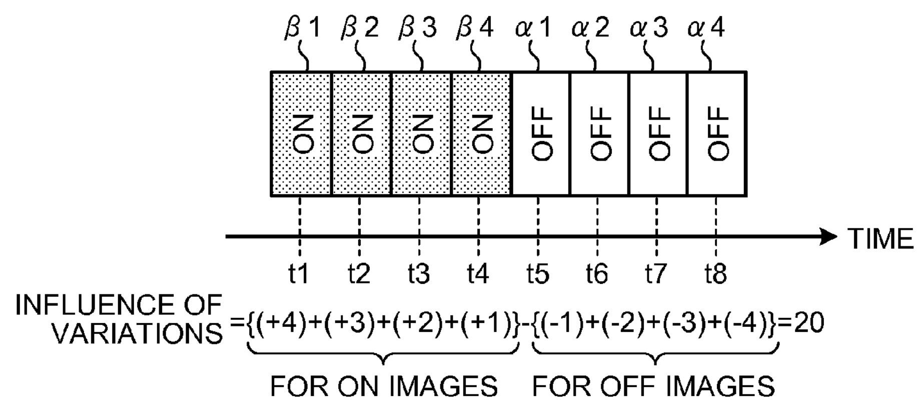
FIG. 4 is a schematic of another example of the image capturing sequence.
Figure 5:
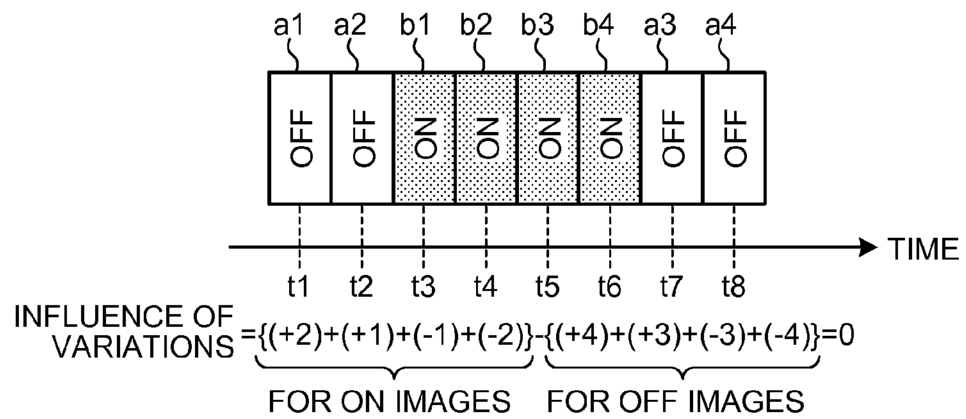
FIG. 5 is a schematic of another example of the image capturing sequence.
Figure 6:
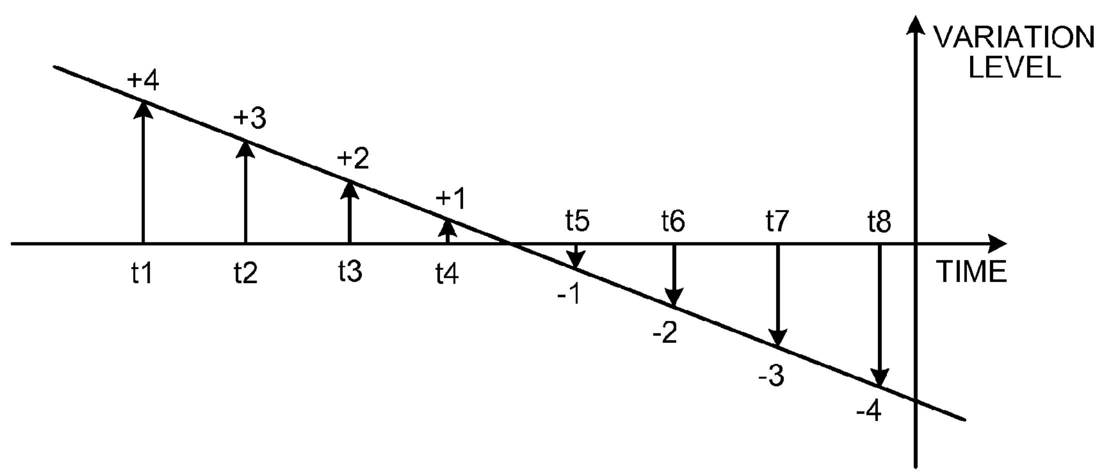
FIG. 6 is a schematic of an example of a relation between time and a variation level.

FIGS. 4 and 5 are schematics of examples of an image capturing sequence. FIG. 6 is a schematic of an example of a relation between time and a variation level. Illustrated in FIG. 4 is an image capturing sequence in which an ON image is captured continuously for four times, and then OFF image is captured continuously for four times. Illustrated in FIG. 5 is an image capturing sequence that is the same as that illustrated in FIG. 2. FIG. 6 schematically illustrates a degree by which the position of the subject or the intensity of external light changes from time t1 to time t8, each at which an image is captured, and reference time t positioned at the center of the time while which these eight images are captured.

Because ON images β1 to β4 illustrated in FIG. 4 are captured at "t1", "t2", "t3", and "t4", respectively, the degree of change from the reference time t becomes "+4", "+3", "+2", and "+1", as illustrated in FIG. 6. Therefore, the total degree of change for the ON images β1 to β4 reaches "10". Because OFF images α1 to α4 are captured at "t5", "t6", "t7", and "t8", respectively, the degree of change from the reference time becomes "−4", "−3", "−2", and "−1", respectively, as illustrated in FIG. 6. Therefore, the total degree of change for the OFF images α1 to α4 also reaches "10". Therefore, when difference images αβ1 to αβ4 are computed, the degree of change results in "20".

By contrast, because the OFF images a1 to a4 illustrated in FIG. 5 are captured at "t1", "t2", "t7", and "t8", respectively, the degree of change from the reference time t becomes "+4", "+3", "−3", and "−4", as illustrated in FIG. 6. Therefore, the total degree of change for the OFF images a1 to a4 can be suppressed to "0". Because the ON images b1 to b4 are captured at "t3", "t4", "t5", and "t6", respectively, the degree of change from the reference time t becomes "+2", "+1", "−2", and "−", respectively, as illustrated in FIG. 6. Therefore, the total degree of change for the ON images b1 to b4 can also be suppressed to "0". Therefore, when difference images αβ1 to αβ4 are computed, the degree of change can be suppressed to "0".

In particular, when used is an image capturing sequence in which the illumination ON images are positioned at the center, the illumination ON images can be captured continuously. Because the illumination ON images include external light as well as the light from the illumination itself, such images have higher luminance than that in the illumination OFF images. Therefore, illumination ON images are more affected by variations in the subject or the external light than the illumination OFF images. By capturing such illumination ON images continuously, the influence of such variations can be further reduced.

Based on the reason described above, it can be understood that, when the image capturing sequence illustrated in FIG. 5 is used, the influence of time-dependent variations in the position of the subject or the intensity of external light can be reduced, compared with when the image capturing sequence illustrated in FIG. 4 is used.

The integrating unit 12*f* is a processing unit that integrates difference images. As a possible implementation, when N pieces of difference images are computed by the computing unit 12*e*, the integrating unit 12*f* reads the N pieces of difference images from the storage unit 12*b*, and acquires the sum of the pixel values for each pixel of the N pieces of difference images read from the storage unit 12*b*. In this manner, a single piece of integrated image can be generated from the N pieces of difference images. Because the difference between each of the ON images and each of the OFF images has been computed, the integrated image thus generated will be an image in which the influence of external light is suppressed, represented as if the images were captured only with the illumination from the illumination unit 11*b*. Furthermore, because difference images captured based on a divided exposure time are integrated, images can be captured while keeping the exposure time short. As a result, saturation is suppressed in the resultant integrated image, even when strong external light is present. Therefore, it is possible to acquire an image in which the authenticated region of the user who is in the viewing area of the television receiver is captured appropriately.

The authenticating unit 12*g* is a processing unit that authenticates a gesture of a subject using an integrated image generated by the integrating unit 12*f*. As a possible implementation, the authenticating unit 12*g* extracts an image portion that is similar to the shape of a hand from the integrated image as an image to be authenticated, by applying image processing such as edge detection or skin color detection to the integrated image. The authenticating unit 12*g* then executes an image matching process such as pattern matching between the image to be authenticated extracted via the image processing and the gesture pattern image stored in the storage unit 12*b*. An example of the gesture pattern image includes an image representing a pattern of the shape of a hand rising fingers in the number corresponding to a channel number. For example, the authenticating unit 12*g* computes the similarity between each of the gesture pattern images and the image to be authenticated. The authenticating unit 12*g* then determines if there is any gesture pattern image with a similarity to the authenticated image higher than a predetermined threshold. If there is any pattern image with a similarity higher than the threshold, the authenticating unit 12*g* outputs a gesture corresponding to the pattern image or a command corresponding to the gesture to the television receiver. In this manner, the television receiver is caused to execute a command corresponding to the gesture, that is, to change the channel, in the example mentioned above.

As the image capturing instructing unit 12*c*, the determining unit 12*d*, the computing unit 12*e*, the integrating unit 12*f*, and the authenticating unit 12*g*, various types of integrated circuits or electronic circuits may be used. An example of an integrated circuit includes an ASIC. Examples of an electronic circuit include a CPU or an MPU.

As the storage unit 12*b*, a semiconductor memory device or a storage device may be used. Examples of the semiconductor memory device include a VRAM, a PAM, and a flash memory. Examples of the storage device include storage devices such as a hard disk or an optical disk.

Sequence of Processes

The sequence of processes performed by the gesture authentication system 10 according to the first embodiment will now be explained. In this section, (1) an authenticating process performed by the gesture authentication system 10 will be explained to begin with, and (2) a divisor determining process and (3) an image capturing process included in the authenticating process will then be explained in detail.

(1) Authenticating Process

Figure 7:
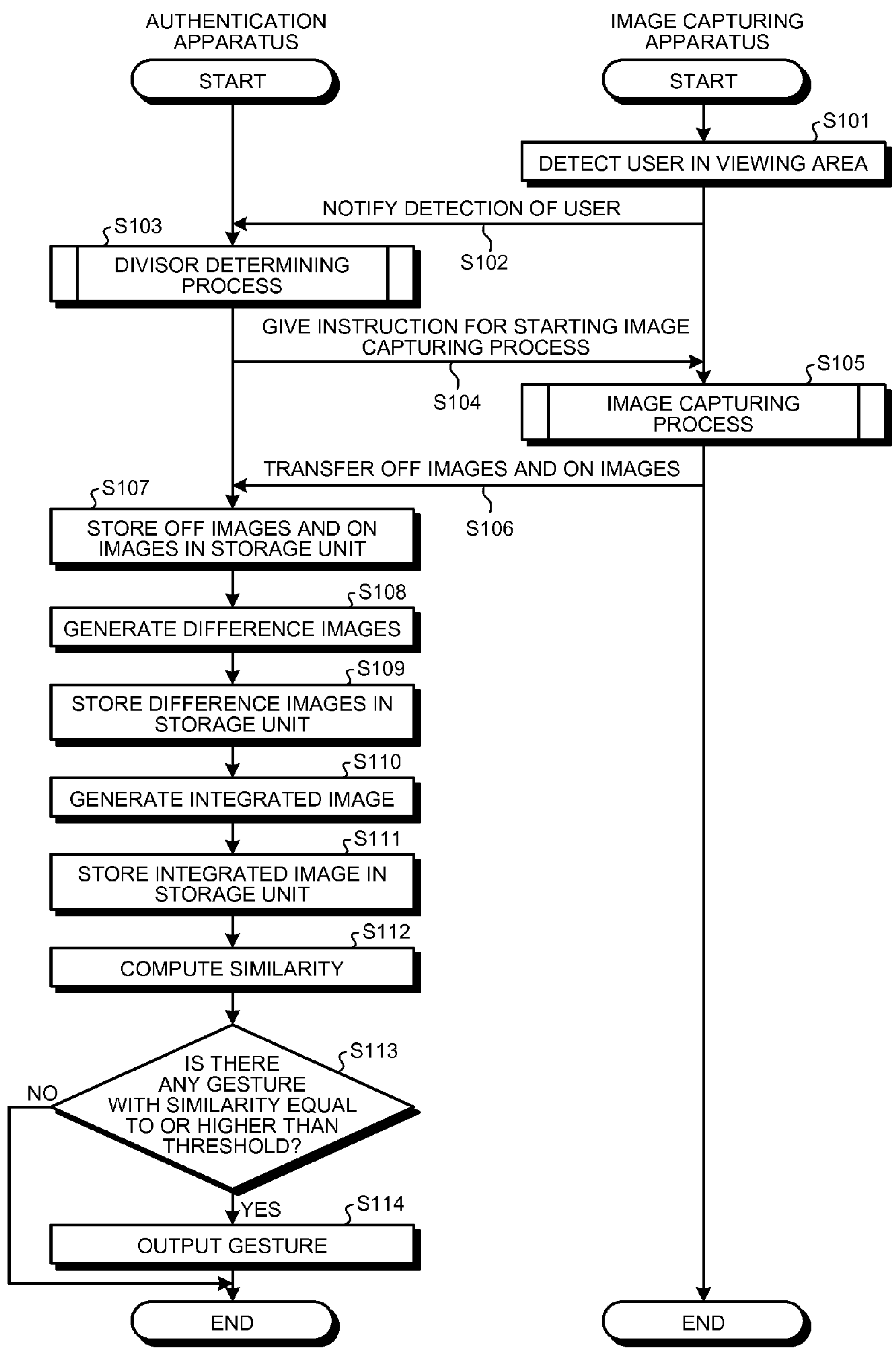
FIG. 7 is a flowchart illustrating an authenticating process according to the first embodiment.

FIG. 7 is a flowchart illustrating an authenticating process according to the first embodiment. This authenticating process is initiated when the sensor unit 11*a* detects a user in the viewing area of the television receiver. As illustrated in FIG. 7, when the sensor unit 11*a* detects a user in the viewing area (Step S101), the image capturing control unit 11*f* notifies the authentication apparatus 12 that a user is detected in the viewing area (Step S102).

In response, the determining unit 12*d* in the authentication apparatus 12 executes a "divisor determining process" for determining the divisor N by which the exposure time E is divided (Step S103). The image capturing instructing unit 12*c* then sends an image capturing instruction containing image capturing parameters including the divisor N determined by the determining unit 12*d* to the authentication apparatus 12 (Step S104).

The image capturing control unit 11*f* receiving the image capturing instruction then executes an "image capturing process" in which N pieces of OFF images and N pieces of ON images are captured, in the order of N/2 pieces of OFF images, N pieces of ON images, and N/2 pieces of OFF images (Step S105). The image capturing control unit 11*f* then transfers the N pieces of OFF images and the N pieces of ON images to the authentication apparatus 12 via the communicating unit 11*d* (Step S106).

The image capturing instructing unit 12*c* in the authentication apparatus 12 then stores the N pieces of OFF images and the N pieces of ON images in the storage unit 12*b* (Step S107). The computing unit 12*e* then determines N pairs of an OFF image and an ON image, and computes N pieces of difference images from the respective pairs of an OFF image and an ON image (Step S108). The computing unit 12*e* then stores the N pieces of difference images computed at Step S108 in the storage unit 12*b* (Step S109).

The integrating unit 12*f* then generates a single piece of integrated image from the N pieces of difference images, by acquiring the sum of the pixel values across the N pieces of difference images stored in the storage unit 12*b* (Step S110). The integrating unit 12*f* then stores the integrated image generated at Step S110 in the storage unit 12*b* (Step S111).

The authenticating unit 12*g* then computes a similarity between an image of the authenticated region detected from the integrated image stored in the storage unit 12*b* at Step S111 and each of the gesture pattern images stored in the storage unit 12*b* (Step S112).

If any pattern image has a similarity higher than the predetermined threshold (Yes at Step S113), the authenticating unit 12*g* executes the following process. In other words, the authenticating unit 12*g* outputs a gesture corresponding to the pattern image or a command corresponding to the gesture to the television receiver (Step S114), and the process is ended. If no pattern image has a similarity higher than the predetermined threshold (No at Step S113), the process is ended at this point.

(2) Divisor Determining Process

Figure 8:
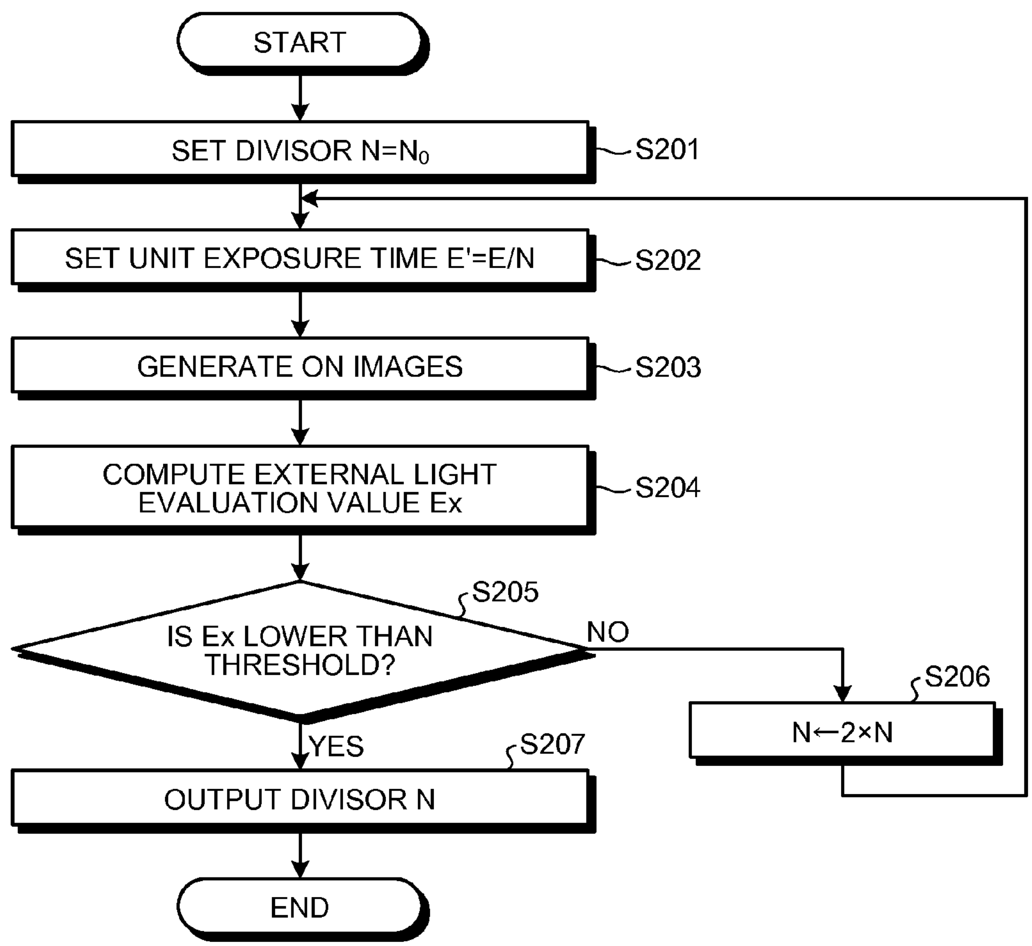
FIG. 8 is a flowchart illustrating a divisor determining process according to the first embodiment.

FIG. 8 is a flowchart illustrating a divisor determining process according to the first embodiment. This process is initiated when the process at Step S102 is executed in the authenticating process illustrated in FIG. 7, that is, when a notification of a user detection is received from the image capturing apparatus 11.

As illustrated in FIG. 8, the determining unit 12*d* sets the initial value $N_0$ preferably applied in an environment without any external light to the divisor N (Step S201). The determining unit 12*d* then sets the unit exposure time E' to E/N computed from the exposure time E and the divisor N (Step S202).

The determining unit 12*d* then causes the image capturing apparatus 11 to capture a predetermined number of ON images based on the unit exposure time E' (Step S203). The determining unit 12*d* then computes an external light evaluation value Ex serving as an index for the intensity of external light from the ON images captured at Step S203 (Step S204). The determining unit 12*d* then determines if the external light evaluation value Ex is lower than a predetermined threshold Th (Step S205).

If the external light evaluation value Ex is equal to or higher than the predetermined threshold Th (No at Step S205), it can be assumed that saturation is likely to be produced on images when the images are captured based on the unit exposure time E'. In such a case, the determining unit 12*d* updates the divisor N to a value larger than the previous value, e.g., a value twice the previous divisor (Step S206). The system control then goes to Step S202, and the determining unit 12*d* repeats the process of updating the divisor, setting a unit exposure time E', causing the image capturing apparatus 11 to capture ON images, and computing the external light evaluation value Ex, until the external light evaluation value Ex reaches a value lower than the threshold Th.

If the external light evaluation value is lower than the predetermined threshold (Yes at Step S205), it can be assumed that saturation is not likely to be produced on ON images when the images are captured based on the unit exposure time E'. In such a case, the determining unit 12*d* outputs the divisor N used at Step S201 or Step S206 to the image capturing instructing unit 12*c* (Step S207), and the process is ended.

(3) Image Capturing Process

Figure 9:
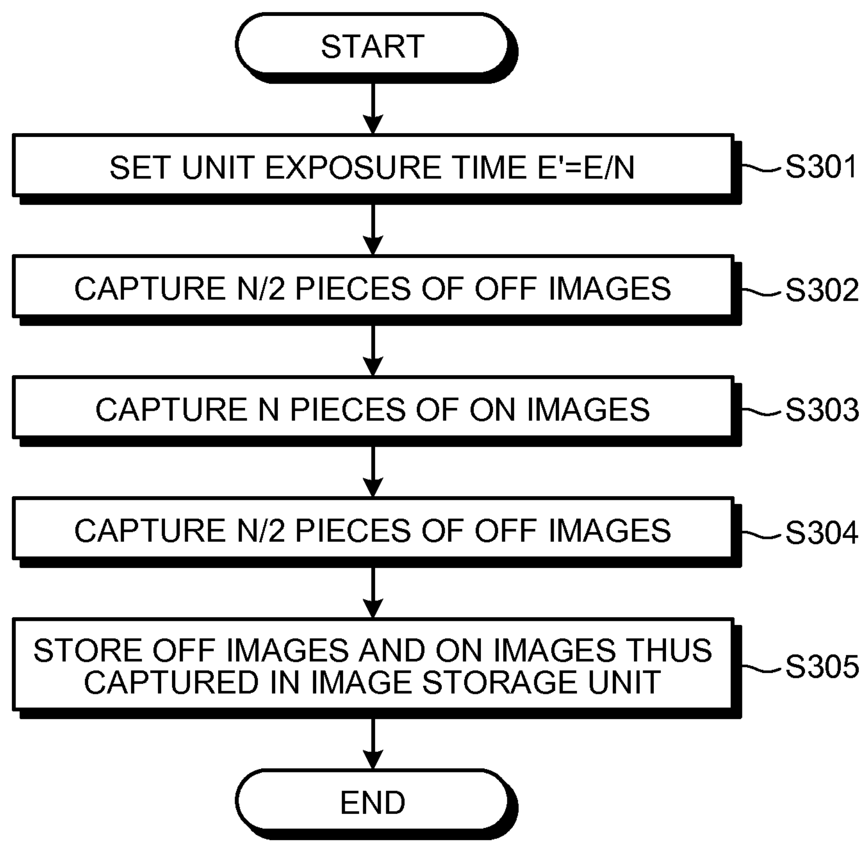
FIG. 9 is a flowchart illustrating an image capturing process according to the first embodiment.

FIG. 9 is a flowchart illustrating an image capturing process according to the first embodiment. The image capturing process is initiated when the process at Step S104 is executed in the authenticating process illustrated in FIG. 7, that is, when an image capturing instruction is received from the authentication apparatus 12.

As illustrated in FIG. 9, if an image capturing instruction containing the exposure time E, the divisor N, and the like is received from the authentication apparatus 12, the image capturing control unit 11*f* computes the unit exposure time E' representing an exposure time for a single piece of image, by dividing the exposure time E by the divisor N (Step S301).

The image capturing control unit 11*f* then turns OFF the illumination unit 11*b*, and captures N/2 pieces of OFF images (Step S302). The image capturing control unit 11*f* then turns ON the illumination unit 11*b*, and captures N pieces of ON images (Step S303). The image capturing control unit 11*f* then turns OFF the illumination unit 11*b*, and captures N/2 pieces of OFF images (Step S304).

Finally, the image capturing control unit 11*f* stores the N pieces of OFF images and the N pieces of ON images captured at Steps S302 to S304 in the image storage unit 11*e* (Step S305), and the process is ended.

Advantageous Effects Achieved by First Embodiment

As described above, the gesture authentication system 10 according to the first embodiment turns OFF the illumination unit 11*b* and captures OFF images before and after N pieces of ON images are captured. Therefore, in the gesture authentication system 10 according to the first embodiment, because the frequency at which the illumination is switched from ON to OFF and switched from OFF to ON can be reduced, the frequency of and the time for null write can be reduced. As a result, idle time for capturing images can be reduced. Therefore, the gesture authentication system 10 according to the first embodiment can reduce the image capturing time.

Furthermore, in the gesture authentication system 10 according to the first embodiment, the authentication apparatus 12 executes the process of capturing ON images and determining the divisor through trial-and-error, the process of computing the difference between an OFF image and an ON image, the process of integrating the difference images, and the like. Therefore, the gesture authentication system 10 according to the first embodiment can simplify the functional configuration of the image capturing apparatus 11. There are more advantageous effects that can be achieved by simplifying the image capturing apparatus 11. For example, in a possible configuration in which a gesture authentication is executed, the authentication apparatus 12 may be built into a fixed place, e.g., near the television receiver or in the television receiver, but the place where the image capturing apparatus 11 is installed may be changed depending on how the image capturing apparatus 11 is used by the user. Furthermore, another possible configuration of the system may include one authentication apparatus 12 and a plurality of image capturing apparatuses 11. When such a system configuration is used, the entire cost can be reduced when the configuration of the image capturing apparatus 11 is simplified.

Furthermore, in the gesture authentication system 10 according to the first embodiment, OFF images that are divided into equal groups are captured before and after the ON images are captured, an ON image and an OFF image at the same order are in the order of the time at which these images are captured, and difference images are computed for each of these pairs. Therefore, for example, the influence of variations such as positional changes, e.g., those of when the hand of the subject gradually moves down, changes in the external light intensity due to a blocking object, and the like can be evenly allocated to the OFF image and the ON image for which a difference is computed. Therefore, difference images that are less affected by such variations can be computed stably.

Furthermore, because the ON images are captured continuously at the center of the image capturing sequence, the influence of the variations in the external light and the subject can be reduced. This is because an ON image has higher luminance, an ON image is more influenced by such variations than an OFF image. Therefore, by capturing the ON images continuously at the center of the image capturing sequence, the influence of such variations can be further reduced.

Furthermore, in the gesture authentication system 10 according to the first embodiment, because an OFF image and an ON image are captured an even number of times, redundant OFF images and ON images not used in computing a difference image are not captured. Therefore, the image capturing time can be reduced.

Furthermore, in the gesture authentication system 10 according to the first embodiment, because the image capturing time is reduced, extension of time in which the images are captured can be suppressed even when used is an image sensor capturing images at a low rate and a long interval. Because an inexpensive image sensor can be used, costs can be reduced.

[b] Second Embodiment

Explained in the first embodiment is an example in which the authentication apparatus 12 is caused to generate difference images and an integrated image. However, it is not necessarily need to be the authentication apparatus 12 that generates difference images and an integrated image. Furthermore, explained in the first embodiment is an example in which the image capturing apparatus 11 is caused to capture the images to be used in the gesture authentication, but the image capturing apparatus 11 may also capture images to be used in another type of authentication or determination. Therefore, explained in a second embodiment of the present invention is an example in which an image capturing apparatus 21 is caused to capture OFF images and ON images of the face of a person who is a subject, to generate difference images and an integrated image, and an authentication apparatus 22 is caused to execute a face authentication using the integrated image.

Configuration of Face Authentication System

Figure 10:
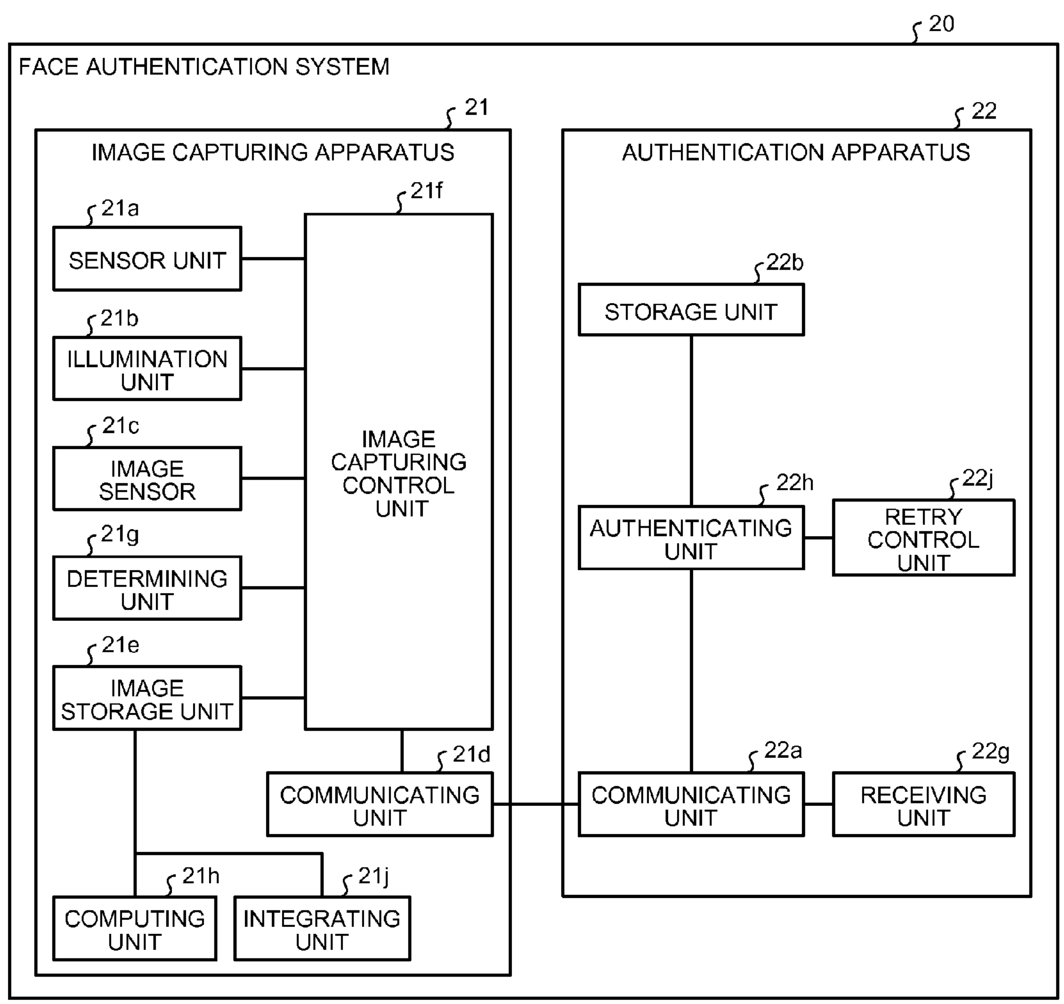
FIG. 10 is a block diagram illustrating functional configurations of apparatuses included in a face authentication system according to a second embodiment of the present invention.

FIG. 10 is a block diagram illustrating functional configurations of apparatuses included in a face authentication system according to the second embodiment. This face authentication system 20 illustrated in FIG. 10 performs a face authentication by matching an integrated image generated from OFF images and ON images in which the face of a person is captured against a registered image that is a pre-registered integrated image of the face of a person based upon which authentication is determined to be successful when the system performs the authentication. In the following description of the second embodiment, it is assumed that the face authentication is used in controlling an entry and exit of someone into and from a gate installed in a facility or at the boundary of a room or a booth of a facility.

As illustrated in FIG. 10, the face authentication system 20 includes the image capturing apparatus 21 and the authentication apparatus 22. Among these apparatuses, the image capturing apparatus 21 is installed at a position allowing the face of a person passing through a gate to be captured in the angle of view of the image capturing apparatus 21, as an example, so that an image of the face of a person passing through the gate can be captured. As an example, the authentication apparatus 22 may be implemented as a server connected to a plurality of the image capturing apparatuses 21. Alternatively, a function for performing the face authentication may be incorporated into the image capturing apparatus 21 so that face authentication can be performed on standalone basis.

Configuration of Image Capturing Apparatus 21

To begin with, a functional configuration of the image capturing apparatus 21 according to the second embodiment will be explained. Comparing with the image capturing apparatus 11 illustrated in FIG. 1, the image capturing apparatus 21 illustrated in FIG. 10 includes the following functional units, instead of the sensor unit 11*a*, the illumination unit 11*b*, the image sensor 11*c*, the communicating unit 11*d*, the image storage unit 11*e*, and the image capturing control unit 11*f*. In other words, the image capturing apparatus 21 includes a sensor unit 21*a*, an illumination unit 21*b*, an image sensor 21*c*, a communicating unit 21*d*, an image storage unit 21*e*, and an image capturing control unit 21*f*.

Because the sensor unit 21*a*, the illumination unit 21*b*, the image sensor 21*c*, the communicating unit 21*d*, the image storage unit 21*e*, the image capturing control unit 21*f*, a determining unit 21*g*, a computing unit 21*h*, and an integrating unit 21*j* have basic functions that are the same as those of the respective functional units illustrated in FIG. 1, only the differences are explained hereunder.

Among these units, the sensor unit 21*a* is different from the sensor unit 11*a* illustrated in FIG. 1 in that the sensor unit 21*a* detects a user approaching the gate. Therefore, the sensor unit 21*a* monitors an area where people pass through the gate, e.g., a radius of 1 meter from the gate, as an example. When the sensor unit 21*a* detects a user passing through such a pass-through area, the sensor unit 21*a* notifies the image capturing control unit 21*f*, which will be described later, of entry of the user into the gate pass-through area.

The illumination unit 21*b* is different from the illumination unit 11*b* illustrated in FIG. 1 in that the illumination unit 21*b* illuminates the face of a user approaching the gate. Therefore, the illumination unit 21*b* is installed at a position capable of illuminating the authenticated region of the user, e.g., the face of the user, who is in the pass-through area of the gate detected by the sensor unit 21*a*. When the illumination unit 21*b* has directivity, the illumination unit 21*b* may also be provided with a mechanical unit for allowing the direction in which the illuminating light is output to be adjusted depending on the position of the user in the pass-through area of the gate.

The image sensor 21*c* is different from the image sensor 11*c* illustrated in FIG. 1 in that the image sensor 21*c* is installed at a position enabling the face of the user who is in the pass-through area of the gate to be imaged on a lens not illustrated. The image sensor 21*c* may be provided with a mechanical unit for adjusting the angular field of the image capturing apparatus 21 depending on the position where the user is present in the pass-through area of the gate so as to allow the authenticated region of the use to be imaged on the image sensor 21*c*. The image capturing control unit 21*f*, which will be described later, stores the image captured by the image sensor 21*c* in the image storage unit 21*e*.

The communicating unit 21*d* is different from the communicating unit 11*d* illustrated in FIG. 1 in that the communicating unit 21*d* transmits and receives different types of data to and from other apparatuses including the authentication apparatus 22. For example, the communicating unit 21*d* transmits a notification of a user entering the pass-through area of the gate or an integrated image to the authentication apparatus 22. The communicating unit 21*d* also receives an image capturing ending instruction for ending capturing images of the face of the user who have entered the pass-through area of the gate, or a registered image generating instruction for generating a registered image.

The image storage unit 21*e* is different from the image storage unit 11*e* illustrated in FIG. 1 in that the image storage unit 21*e* stores therein different types of data. As mentioned earlier, in the second embodiment, the image capturing apparatus 21 starts capturing OFF images and ON images, and executes calculations of the difference images and generation of the integrated image. Therefore, in the image storage unit 21*e* stores therein difference images and an integrated image, in addition to the original images such as OFF images and ON images received from the image sensor 21*c*.

The image capturing control unit 21*f* is different from the image capturing control unit 11*f* illustrated in FIG. 1 in that the image capturing process is triggered differently. In other words, because the authentication apparatus 22 illustrated in FIG. 10 performs a face authentication, not the gesture authentication executed in the authentication apparatus 12 illustrated in FIG. 1, the image capturing control unit 21*f* executes the image capturing process, which is executed by the image capturing control unit 11*f* illustrated in FIG. 1, twice, once at a stage registering the face of a person permitted to go through the gate, and another time at a stage generating the face of a user entering gate.

Furthermore, the image capturing apparatus 21 illustrated in FIG. 10 further includes the determining unit 21*g*, the computing unit 21*h*, and the integrating unit 21*j*, as functional units not illustrated in FIG. 1. The determining unit 21*g*, the computing unit 21*h*, and the integrating unit 21*j* are different from the determining unit 12*d*, the computing unit 12*e*, and the integrating unit 12*f* included in the authentication apparatus 12 illustrated in FIG. 1 in that these functional units are provided to the apparatus capturing images. In addition, the determining unit 21*g*, the computing unit 21*h*, and the integrating unit 21*j* are different in performing the process at two stages, in the same manner as the process performed by the image capturing control unit 21*f*.

Configuration of Authentication Apparatus 22

A functional configuration of the authentication apparatus 22 according to the second embodiment will now be explained. The authentication apparatus 22 illustrated in FIG. 10 includes a communicating unit 22*a* and a storage unit 22*b*, instead of the communicating unit 12*a* and the storage unit 12*b* provided to the authentication apparatus 12 illustrated in FIG. 1.

Because the communicating unit 22*a* and the storage unit 22*b* have basic functions that are the same as those of the corresponding functional units illustrated in FIG. 1, only the differences are explained hereunder.

The communicating unit 22*a* is different from the communicating unit 12*a* illustrated in FIG. 1 in that the communicating unit 22*a* transmits and receives different types of data to and from other apparatuses including the image capturing apparatus 21. For example, the communicating unit 22*a* transmits an image capturing ending instruction and a registered image generating instruction to the image capturing apparatus 21. The communicating unit 22*a* also receives an integrated image and a notification of a user entering the pass-through area of the gate from the image capturing apparatus 21.

The storage unit 22*b* is different from the storage unit 12*b* illustrated in FIG. 1 in that the storage unit 22*b* stores therein different types of data. In other words, because, in the second embodiment, the image capturing apparatus 21 not only captures OFF images and ON images, but also performs computation of difference images and generation of an integrated image, only the integrated image is stored in the storage unit 22*b*, without storing therein OFF images, ON images, and difference images. For example, when the sensor unit 21*a* detects a user entering the pass-through area of the gate, the storage unit 22*b* stores therein a registered image against which the integrated image of the user generated by the image capturing apparatus 21 is compared. Explained herein is an example in which stored as a registered image is an integrated image of a permitted person who is permitted to make an entry or exit through the gate by the administrator of the face authentication system 20, as well as characterizing quantities extracted from the integrated image. However, alternatively, only one of the integrated image or the characterizing quantities of the permitted person may also be stored.

Furthermore, the authentication apparatus 22 illustrated in FIG. 10 includes a receiving unit 22*g*, an authenticating unit 22*h*, and a retry control unit 22*j*, as functional units not illustrated in FIG. 1.

The receiving unit 22*g* is a processing unit that receives an instruction for generating a registered image. As a possible implementation of the receiving unit 22*g*, various types of user interface such as a keyboard or a touch panel can be used. For example, the receiving unit 22*g* receives an instruction for generating a registered image of a permitted person who is permitted to make an entry or exit through the gate from the administrator of the face authentication system 20, and notifies the image capturing apparatus 21 of the instruction for generating the registered image. In this manner, the image capturing apparatus 21 is caused to capture the OFF images and the ON images of the face of a person whose registered image is to be generated, to compute difference images, and to generate an integrated image. The receiving unit 22*g* may also be independently implemented outside of the authentication apparatus 22.

The authenticating unit 22*h* is a processing unit that performs a face authentication of a subject using an integrated image of a user received from the image capturing apparatus 21 and a registered image of a permitted person stored in the storage unit 22*b*. As a possible implementation, the authenticating unit 22*h* detects an image of a portion corresponding to the face by executing template matching to an integrated image. The authenticating unit 22*h* extracts geometric characteristics such as the shape or the size of a part of the face, such as eyes, a nose, a mouth, and ears, from the image corresponding to the face portion detected by the template matching as characterizing quantities. The authenticating unit 22*h* then computes a similarity S between each of the registered images stored in the storage unit 22*b* and characterizing quantities. The authenticating unit 22*h* determines that the authentication is successful if there is any registered image resulting in a similarity S higher than the predetermined threshold. In such a case, it is not necessary to retry the authentication. Therefore, the authenticating unit 22*h* notifies the image capturing apparatus 21 of an image capturing ending instruction, and outputs a notification of the successful authentication to a device unlocking the door, for example. As a result, the user having entered the pass-through area of the gate is permitted to enter or exit. By contrast, if there is only some registered image resulting in a similarity S less than the predetermined threshold, the authenticating unit 22*h* determines that the authentication has failed. In such a case, the retry control unit 22*j*, which will be described later, is caused to determine if the authentication has been retried for a certain number of times. The threshold compared with the similarity S can be specified in any way. For example, the threshold can be lowered when it is preferable to reduce the false rejection rate, and can be raised when it is preferable to reduce the false acceptance rate.

The retry control unit 22*j* is a processing unit that controls retries of the face authentication. As a possible implementation, the retry control unit 22*j* initializes a retry count R recorded in an internal memory not illustrated to zero when a user entering the pass-through area of the gate is detected. The retry control unit 22*j* then increments the retry count R when the authenticating unit 22*h* determines that the authentication has failed, and determines if the retry count R is equal to or higher than the predetermined threshold. If the retry count R is lower than the predetermined threshold, the retry control unit 22*j* permits an authentication retry. When an authentication retry is permitted in the manner described above, the retry control unit 22*j* causes the authenticating unit 22*h* to perform a series of the processes including extracting characterizing quantities from an integrated image of the user, computing a similarity with the registered images, and determining if there is any registered image resulting in a similarity equal to or higher than the threshold. If the retry count is equal to or higher than the threshold, the retry control unit 22*j* does not permit any further retry. In such a case, because it is no longer necessary to generate an integrated image of the user, the retry control unit 22*j* notifies the image capturing apparatus 21 of an image capturing ending instruction, and outputs a notification of the authentication failure to the image capturing apparatus 21. The threshold compared with the retry count B can be specified in any way. For example, the threshold can be raised when it is preferable to reduce the false rejection rate, and can be lowered when it is preferable to reduce the false acceptance rate.

Sequence of Processes

Processes performed by the face authentication system 20 according to the second embodiment will now be explained. Explained hereunder are (1) a registration process for generating and storing a registered image and (2) an authenticating process performed by the face authentication system 20. The divisor determining process and the image capturing process included in the registration process and the authenticating process are the same as those according to the first embodiment. Therefore, explanations thereof are omitted herein.

(1) Registration Process

Figure 11:
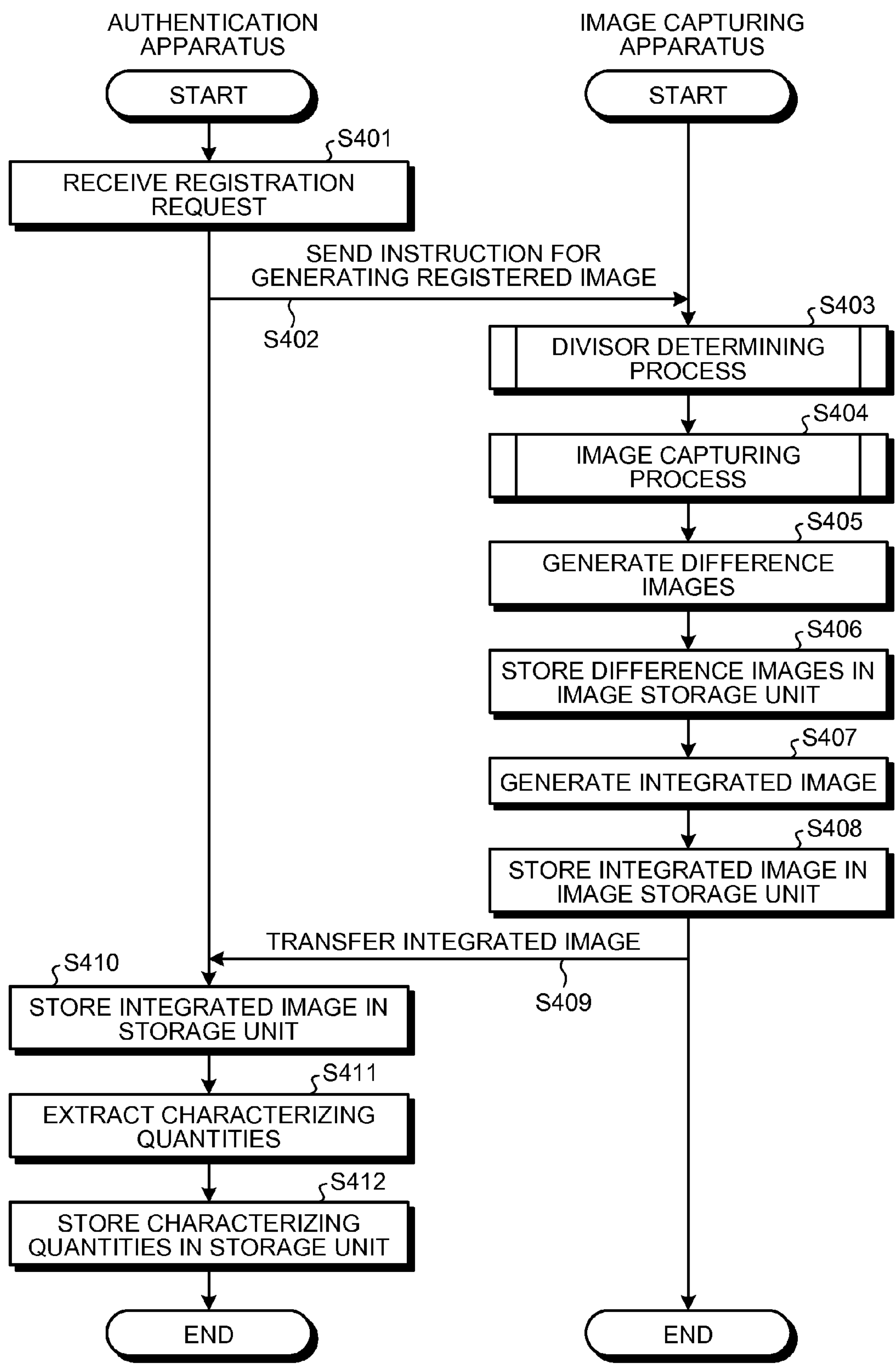
FIG. 11 is a flowchart illustrating a registration process according to the second embodiment.

FIG. 11 is a flowchart illustrating a registration process according to the second embodiment. This registration process is initiated when the authentication apparatus 22 receives an instruction for generating a registered image from the administrator.

As illustrated in FIG. 11, when an instruction for generating a registered image is received (Step S401), the receiving unit 22*g* notifies the image capturing apparatus 21 of the instruction for generating a registered image (Step S402).

In response, the determining unit 21*g* in the image capturing apparatus 21 executes the "divisor determining process" for determining the divisor N by which the exposure time E is divided (Step S403). At Step S403, the determining unit 21*g* can execute the same process as that explained in the first embodiment (see FIG. 8).

The image capturing control unit 21*f* then executes the following process using the image capturing parameters including the divisor N determined by the determining unit 21*g*. In other words, the image capturing control unit 21*f* executes the "image capturing process" in which N pieces of OFF images and N pieces of ON images are captured in the order of N/2 pieces of OFF images, N pieces of ON images, and N/2 pieces of OFF images (Step S404). At Step S404, the image capturing control unit 21*f* can execute the same process as that explained in the first embodiment (see FIG. 9).

The computing unit 21*h* then determines N pairs of an OFF image and an ON image, and computes N pieces of difference images from the respective pairs of an OFF image and an ON image (Step S405). The computing unit 21*h* then stores the N pieces of difference images computed at Step S405 in the image storage unit 21*e* (Step S406).

The integrating unit 21*j* then generates a single piece of integrated image from the N pieces of difference images, by acquiring the sum of the pixel values across the N pieces of difference images stored in the image storage unit 21*e* (Step S407). The integrating unit 21*j* then stores the integrated image generated at Step S407 in the image storage unit 21*e* (Step S408). The image capturing apparatus 21 then transfers the integrated image to the authentication apparatus 22 via the communicating unit 21*d* (Step S409).

The authenticating unit 22*h* then stores the integrated image in the storage unit 22*b* as a registered image (Step S410). The authenticating unit 22*h* extracts geometric characteristics such as the shape or the size of a part of the face, e.g., eyes, a nose, a mouth, and ears, from the registered images stored in the storage unit 22*b* at Step S410 as characterizing quantities (Step S411). The authenticating unit 22*h* then stores the characterizing quantities extracted at Step S411 in the storage unit 22*b*, in a manner associated with the registered image stored at Step S410 (Step S412), and the process is ended.

(2) Authenticating Process

Figure 12:
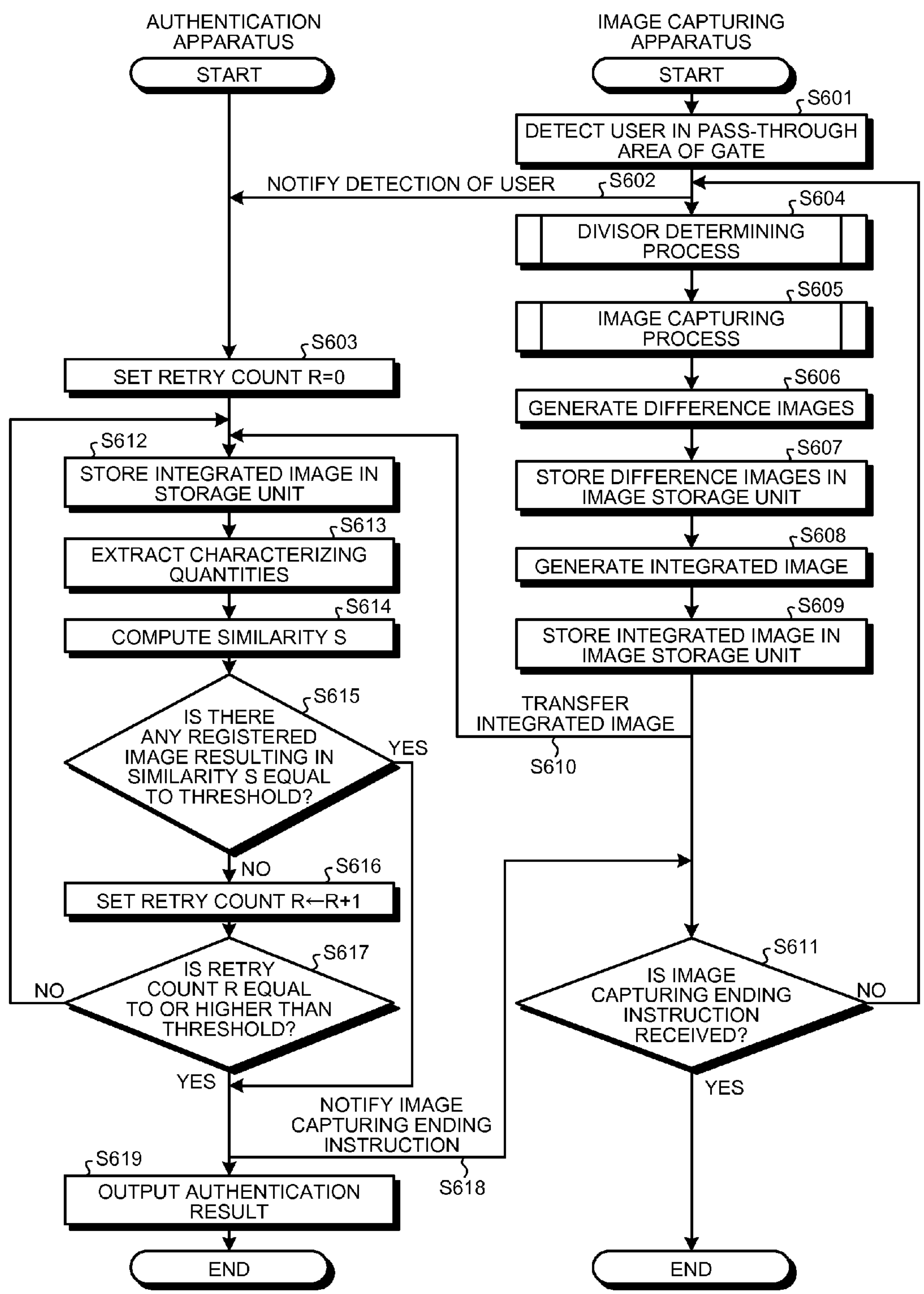
FIG. 12 is a flowchart illustrating an authenticating process according to the second embodiment.

FIG. 12 is a flowchart illustrating an authenticating process according to the second embodiment. This authenticating process is initiated when the sensor unit 21*a* detects a user entering the pass-through area of the gate.

As illustrated in FIG. 12, when the sensor unit 21*a* detects a user entering the pass-through area of the gate (Step S601), the image capturing control unit 21*f* notifies the authentication apparatus 22 of the user entering the pass-through area of the gate (Step S602). The retry control unit 22*j* receiving the notification at Step S602 initializes the retry count R by setting the retry count R to zero (Step S603).

The determining unit 21*g* in the authentication apparatus 22 then executes the "divisor determining process" for determining the divisor N by which the exposure time E is divided (Step S604). At Step S604, the determining unit 21*g* can execute the same process as that explained in the first embodiment (see FIG. 8).

The image capturing control unit 21*f* then executes the following process using the image capturing parameters including the divisor N determined by the determining unit 21*g*. In other words, the image capturing control unit 21*f* executes the "image capturing process" in which N pieces of OFF images and N pieces of ON images are captured in the order of N/2 pieces of OFF images, N pieces of ON images, and N/2 pieces of OFF images (Step S605). At Step S605, the image capturing control unit 21*f* can execute the same process as that explained in the first embodiment (see FIG. 9).

The computing unit 21*h* then determines N pairs of an OFF image and an ON image, and computes N pieces of difference images from the respective pairs of an OFF image and an ON image (Step S606). The computing unit 21*h* then stores the N pieces of difference images computed at Step S606 in the image storage unit 21*e* (Step S607).

The integrating unit 21*j* generates a single piece of integrated image from N pieces of difference images, by acquiring the sum of the pixel values across the N pieces of difference images stored in the image storage unit 21*e* (Step S608). The integrating unit 21*j* then stores the integrated image generated at Step S608 in the image storage unit 21*e* (Step S609). The image capturing apparatus 21 then transfers the integrated image to the authentication apparatus 22 via the communicating unit 21*d* (Step S610).

The process from Step S604 to Step S610 is repeated until an image capturing ending instruction is received from the authentication apparatus 22 (No at Step S611). When an image capturing ending instruction is received (Yes at Step S611), the image capturing apparatus 21 ends the process.

At the same time, the authentication apparatus 22 stores the integrated image received at Step S610 in the storage unit 22*b* (Step S612). The authenticating unit 22*h* then extracts characterizing quantities from the integrated image stored in the storage unit 22*b* at Step S612 (Step S613).

The authenticating unit 22*h* then computes a similarity S between the characterizing quantities extracted from the integrated image of the user at Step S613 and the characterizing quantities of each of the registered images stored in the storage unit 22*b* (Step S614).

The authenticating unit 22*h* then determines if there is any registered image resulting in a similarity S higher than the predetermined threshold (Step S615). If there is no registered image resulting in a similarity S equal to or higher than the threshold (No at Step S615), the retry control unit 22*j* increments the retry count R (Step S616), and determines if the retry count R is equal to or higher than the predetermined threshold (Step S617). The authentication apparatus 22 repeats the process from Step S612 to Step S616 until the retry count R reaches a value equal to or higher than the predetermined threshold (No at Step S617).

If there is a registered image resulting in a similarity S equal to or higher than the threshold (Yes at Step S615), or if the retry count R reaches a value equal to or higher than the threshold (Yes at Step S617) the following process is executed. In other words, the authenticating unit 22*h* notifies the image capturing apparatus 21 of an image capturing ending instruction (Step S618), outputs the authentication result of successful authentication or authentication failure to the image capturing apparatus 21 and to the unlocking device not illustrated (Step S619), and ends the process.

Advantageous Effects Achieved by Second Embodiment

As described above, the face authentication system 20 according to the second embodiment turns OFF the illumination unit 11*b* and captures OFF images before and after N pieces of ON images are captured, in the same manner as in the first embodiment described above. Therefore, the face authentication system 20 according to the second embodiment can reduce the frequency at which the illumination is switched from ON to OFF or from OFF to ON, and the frequency of and the time for null write can be reduced. As a result, idle time for capturing images can be reduced. Therefore, in the face authentication system 20 according to the second embodiment as well, the image capturing time can be reduced.

Furthermore, in the face authentication system 20 according to the second embodiment, the image capturing apparatus 21 performs the process of computing the difference between an OFF image and an ON image, the process of integrating the difference images, and the like. Therefore, in the face authentication system 20 according to the second embodiment, only one piece of integrated image can be transferred from the image capturing apparatus 21 to the authentication apparatus 22, without transferring the N pieces of OFF images and the N pieces of ON images. Therefore, the communication traffic between the image capturing apparatus 21 and the authentication apparatus 22 can be reduced. Hence, for example, a communication load on a network connecting the image capturing apparatus 21 and the authentication apparatus 22 can be reduced. As a result, a high speed authenticating process can be realized.

Furthermore, in the face authentication system 20 according to the second embodiment, because the image capturing time is reduced, extension in the image capturing time can be suppressed even when used is an image sensor capturing images at a low rate and a long interval. For this reason, because an inexpensive image sensor can be used, costs can be reduced.

Furthermore, because the ON images are captured continuously at the center of the image capturing sequence, the influence of the variations in the external light and the subject can be reduced. This is because an ON image has higher luminance, an ON image is more influenced by such variations than an OFF image. By capturing the ON images continuously at the center of the image capturing sequence, the influence of such variations can be further reduced.

Explained in the second embodiment is an example in which the face authentication system 20 is used in controlling an entry and exit of user so that the user is permitted or not permitted to make an entry or exit depending on the authentication result output from the authentication apparatus 22. Alternatively, the face authentication system 20 may be used for other purposes. For example, the face authentication system 20 may also be used in login management in which a login to an information processing apparatus such as a personal computer is permitted or not permitted depending on the authentication result.

[c] Third Embodiment

Explained in the second embodiment is an example in which the authentication apparatus 22 is caused to execute a face authentication using an integrated image. However, an integrated image may also be used in determining the material of an object, without limitation to a face authentication. Therefore, explained in a third embodiment of the present invention is an example in which a determination apparatus 32 is caused to determine the material of an object using an integrated image.

Configuration of Material Determining System

Figure 13:
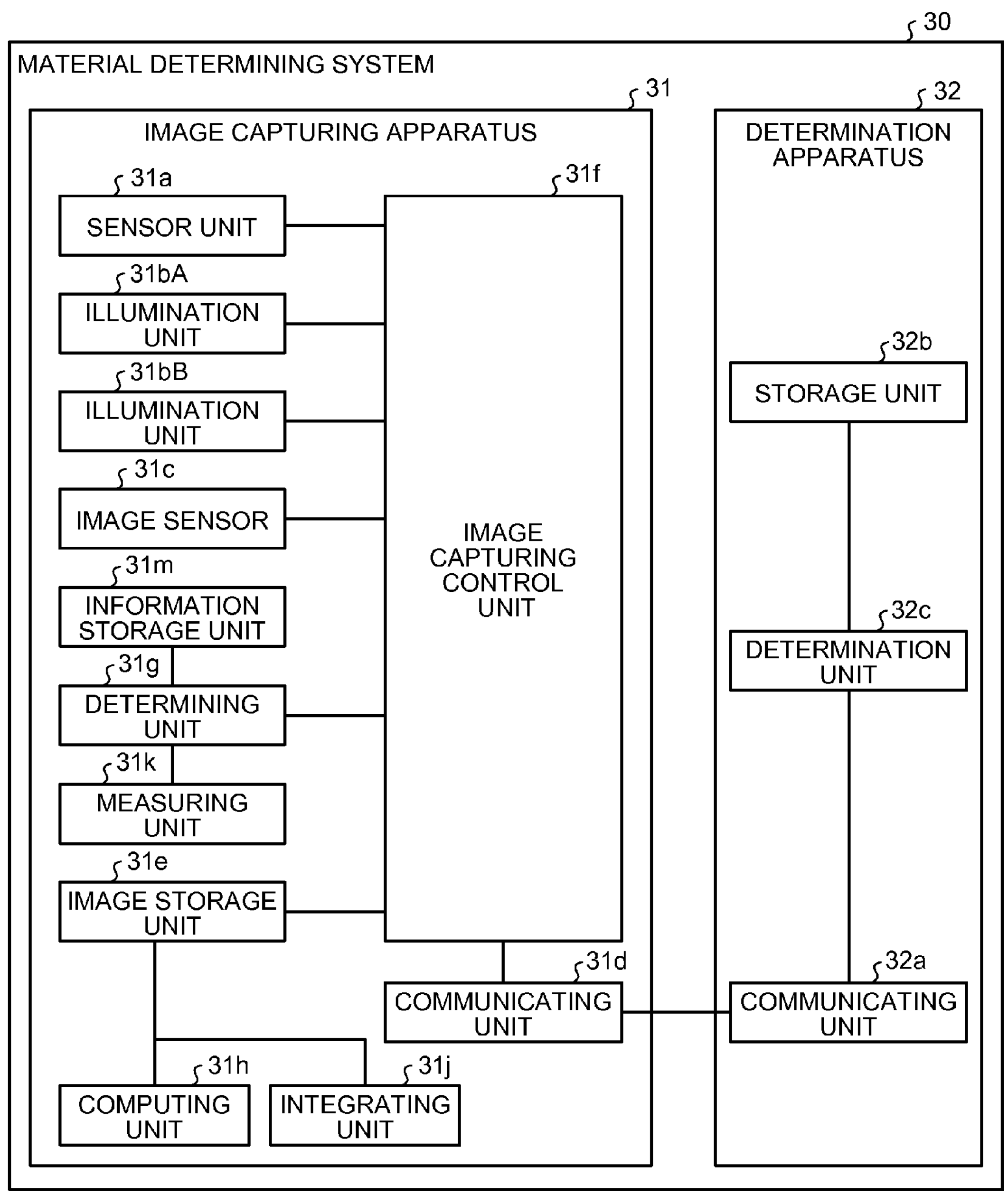
FIG. 13 is a block diagram illustrating functional configurations of apparatuses included in a material determining system according to a third embodiment of the present invention.

FIG. 13 is a block diagram illustrating functional configurations of apparatuses included in a material determining system according to the third embodiment. A material determining system 30 illustrated in FIG. 13 determines the material of an object by comparing an integrated image of the object generated using an illumination unit 31*b*A with an integrated image of the object generated using an illumination unit 31*b*B. In the following description of the third embodiment, as an example, it is assumed that the material determination is used in determining if an object is made of a material α or a material β.

As illustrated in FIG. 13, this material determining system 30 includes an image capturing apparatus 31 and the determination apparatus 32. Among these apparatuses, the image capturing apparatus 31 is installed at a position enabling an object whose material is to be determined to be placed in the angle of view of the image capturing apparatus 31 so that images of the object whose material is to be determined can be captured, as an example. The determination apparatus 32 may be implemented as a server connected to a plurality of image capturing apparatuses 31, as an example. Alternatively, a function for executing the material determination may be incorporated into the image capturing apparatus 31 so that the material determination is performed on standalone basis.

Configuration of Image Capturing Apparatus 31

To begin with, the functional configuration of the image capturing apparatus 31 according to the third embodiment will be explained. The image capturing apparatus 31 illustrated in FIG. 13 includes the following functional units, instead of the sensor unit 21*a*, the illumination unit 21*b*, the image sensor 21*c*, the communicating unit 21*d*, the image storage unit 21*e*, the image capturing control unit 21*f*, the determining unit 21*g*, the computing unit 21*h*, and the integrating unit 21*j* included in the image capturing apparatus 21 illustrated in FIG. 10. In other words, the image capturing apparatus 31 includes a sensor unit 31*a*, the illumination unit 31*b*A, the illumination unit 31*b*B, an image sensor 31*c*, a communicating unit 31*d*, an image storage unit 31*e*, an image capturing control unit 31*f*, a determining unit 31*g*, a computing unit 31*h*, and a integrating unit 31*j*.

The sensor unit 31*a*, an illumination unit 31*b*, the image sensor 31*c*, the communicating unit 31*d*, the image storage unit 31*e*, the image capturing control unit 31*f*, the determining unit 31*g*, the computing unit 31*h*, and the integrating unit 31*j* have basic functions that are the same as those of the respective functional units illustrated in FIG. 10. Therefore, only the differences are explained hereunder.

Among these units, the sensor unit 31*a* is different from the sensor unit 21*a* illustrated in FIG. 10 in that the sensor unit 31*a* detects an object whose material is to be determined. Therefore, the sensor unit 31*a* monitors an area in which the object whose material is to be determined is installed, e.g., a radius of 1 meter, from the image capturing apparatus 31. When the sensor unit 31*a* detects any object in such an installation area, the sensor unit 31*a* notifies the image capturing control unit 31*f*, which will be described later, that an object is installed in the installation area.

The illumination unit 31*b*A is different from the illumination unit 21*b* illustrated in FIG. 10 in that the illumination unit 31*b*A illuminates the object whose material is to be determined. Therefore, the illumination unit 31*b*A is installed at a position for illuminating the central portion of a region to be determined of the object that is installed in the installation area detected by the sensor unit 31*a*, for example. When the illumination unit 31*b*A has directivity, the illumination unit 31*b*A may be provided with a mechanical unit for allowing the direction to which the illuminating light is output to be adjusted depending on the position of an object in the installation area. In the description hereunder, it is assumed that the illumination unit 31*b*A uses an illumination A with a wavelength at $\lambda_A$ as a light source.

The illumination unit 31*b*B is different from the illumination unit 31*b*A in that the wavelength of the light source is longer than that of the illumination unit 31*b*A. In the description below, it is assumed that the illumination unit 31*b*B uses an illumination B having a wavelength at $\lambda_B$ is that is longer than $\lambda_A$ as a light source.

The image sensor 31*c* is different from the image sensor 21*c* illustrated in FIG. 10 in that the image sensor 31*c* is installed at a position where the object in the installation area is allowed to be imaged on the image sensor 21*c* via a lens not illustrated. The image sensor 31*c* may also include a mechanical unit for adjusting the angular field of the image capturing apparatus 31 depending on the position of the object in the installation area so that the region to be determined of the object can be imaged on the image sensor 31*c*. The image capturing control unit 31*f*, which will be described later, stores the images captured by the image sensor 31*c* in the image storage unit 31*e*.

The communicating unit 31*d* is different from the communicating unit 21*d* illustrated in FIG. 10 in that the communicating unit 31*d* transmits and receives different types of data to and from other apparatuses including the determination apparatus 32. For example, the communicating unit 31*d* transfers an integrated image for the illumination unit 31*b*A and an integrated image for the illumination unit 31*b*B both of which are generated by the integrating unit 31*j* to be described later to the determination apparatus 32.

The image storage unit 31*e* stores therein different types of data from those stored in the image storage unit 21*e* illustrated in FIG. 10. As described above, in the third embodiment, the image capturing apparatus 31 captures the OFF images and the ON images using the illumination units 31*b*A and 31*b*B, computes difference images, and generates an integrated image. Therefore, the image storage unit 31*e* stores therein original images such as OFF images and ON images for the illumination units 31*b*A and 31*b*B acquired from the image sensor 31*c*, difference images, and an integrated image.

The image capturing control unit 31*f* is different from the image capturing control unit 21*f* illustrated in FIG. 10 in that image capturing control unit 31*f* captures not only ON images with the illumination unit 31*b*A but also ON images with the illumination unit 31*b*B. As an example, the image capturing control unit 31*f* turns ON the illumination unit 31*b*A and turns OFF the illumination unit 31*b*B, and captures N pieces of ON images with the illumination unit 31*b*A before and after turning OFF the illumination unit 31*b*A, turning ON the illumination unit 31*b*B, and capturing N pieces if ON images with the illumination unit 31*b*B. Furthermore, the image capturing control unit 31*f* also turns OFF the illumination unit 31*b*A and the illumination unit 31*b*B, and captures 2*N pieces of OFF images before and after turning ON the illumination unit 31*b*A, turning OFF the illumination unit 31*b*B, and capturing N pieces of ON images with the illumination unit 31*b*A. For example, after turning OFF the illumination unit 31*b*A and the illumination unit 31*b*B and capturing N pieces of OFF images, the image capturing control unit 31*f* turns ON the illumination unit 31*b*A and captures N/2 pieces of ON images with the illumination unit 31*b*A. The image capturing control unit 31*f* then turns OFF the illumination unit 31*b*A and turns ON the illumination unit 31*b*B, and captures N pieces of ON images with the illumination unit 31*b*B. The image capturing control unit 31*f* then turns OFF the illumination unit 31*b*B, turns ON the illumination unit 31*b*A, and captures N/2 pieces of ON images with the illumination unit 31*b*A, and then turns OFF the illumination unit 31*b*A and the illumination unit 31*b*B and captures N pieces of OFF images.

Figures 14, 15:
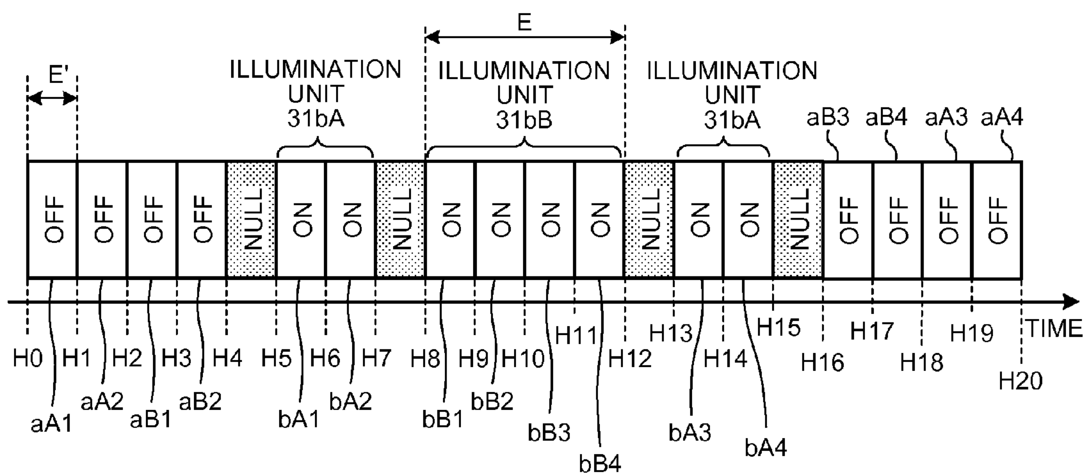
FIG. 14 is a schematic of an example of an image capturing sequence.
FIG. 15 is a schematic of an example of information in which an output current is associated with a divisor.

FIG. 14 is a schematic of an example of the image capturing sequence. Illustrated as an example in FIG. 14 is an image capturing sequence of when the divisor N is "4". As illustrated in FIG. 14, the image capturing control unit 31*f* keeps the illumination unit 31*b*A and the illumination unit 31*b*B OFF for a period from time H0 to time H4, and closes the shutter temporarily at time H1, time H2, and time H3. In this manner, the image capturing control unit 31*f* stores an OFF image aA1 acquired through the exposure over a period from "H0 to H1", an OFF image aA2 acquired through the exposure over a period from "H1to H2", an OFF image aB1 acquired through the exposure over a period from "H2 to H3", and an OFF image aB2 acquired through the exposure over a period from "H3 to H4" in the image storage unit 31*e* in the order described herein. The image capturing control unit 31*f* then switches the illumination unit 31*b*A from OFF to ON at time H4. At this time, the image capturing control unit 31*f* performs null write to the image storage unit 31*e* for an image acquired through the exposure over a period "H4 to H5", assuming that switching from OFF to ON takes time from time H4 to time H5.

The image capturing control unit 31*f* keeps the illumination unit 31*b*A ON for a period from time H5 to time H7, closes the shutter temporarily at time H6. As a result, an ON image bA1 acquired through the exposure over a period from "H5 to H6" and an ON image bA2 acquired through the exposure over a period from "H6 to H7" are stored in the image storage unit 31*e* in the order described herein. The image capturing control unit 31*f* then switches the illumination unit 31*b*A from ON to OFF at time H7, and switches the illumination unit B from OFF to ON. The image capturing control unit 31*f* then performs null write to the image storage unit 31*e* for an image acquired through the exposure over a period "H7 to H8". The image capturing control unit 31*f* then keeps the illumination unit 31*b*B ON for a period from time H8 to time H12, and closes the shutter temporarily at time H9, time H10, and time H11. In this manner, the image capturing control unit 31*f* causes the image storage unit 31*e* to store therein an ON image bB1 acquired through the exposure over a period from "H8 to H9", an ON image bB2 acquired through the exposure over a period from "H9 to H10", an ON image b83 acquired through the exposure over a period from "H10 to H11", and an ON image bB4 acquired through the exposure over a period from "H11 to H12" in the order described herein. The image capturing control unit 31*f* then switches the illumination unit 31*b*A from OFF to ON, and switches the illumination unit B from ON to OFF at time H12. The image capturing control unit 31*f* then performs null write to the image storage unit 31*e* for an image acquired through the exposure over a period "H12 to H13".

The image capturing control unit 31*f* then keeps the illumination unit 31*b*A ON for a period from time H13 to time H15, and closes the shutter temporarily at time H14. As a result, an ON image bA3 acquired through the exposure over a period from "H13 to H14 " and an ON image bA4 acquired through the exposure over a period from "H14 to H15" are stored in the image storage unit 31*e* in the order described herein. The image capturing control unit 31*f* then switches the illumination unit 31*b*A from ON to OFF at time H15. The image capturing control unit 31*f* then performs null write to the image storage unit 31*e* for an image acquired through the exposure over a period "H15 to H16". The image capturing control unit 31*f* then keeps the illumination unit 31*b*A and the illumination unit 31*b*B OFF for a period from time H16 to time H20, and closes the shutter temporarily at time H17, time H18, and time H19. In this manner, the image capturing control unit 31*f* causes the image storage unit 31*e* to store therein an OFF image aB3 acquired through the exposure over a period from "H16 to H17", an OFF image aB4 acquired through the exposure over a period from "H17 to H18", an OFF image aA3 acquired through the exposure over a period from "H18 to H19", and an OFF image aA4 acquired through the exposure over a period from "H19 to H20" in the order described herein.

The determining unit 31*g* is different from the determining unit 21*g* illustrated in FIG. 10 in that the determining unit 31*g* determines the divisor using information in which the intensity of the external light is associated with a divisor. As a possible implementation, the determining unit 31*g* determines the divisor N using information in which an output current is associated with a divisor. This information serves as an index for the intensity of external light, and is stored in an information storage unit 31*m* which is to be described later. FIG. 15 is a schematic of an example of information in which an output current is associated with a divisor. For example, when an output current measured with a measuring unit 31*k* to be described later is 35 milliamperes, the determining unit 31*g* determines "4" as the divisor N. In determining the divisor N, in order to suppress saturation, the determining unit 31*g* determines the divisor N using an illumination whose optimal exposure time is the longest. For example, when the optimal exposure time with the light from the illumination unit 31*b*B is longer than that with the illumination unit 31*b*A, the determining unit 31*g* causes the measuring unit 31*k* to measure the output current using the light of the illumination unit 31*b*B, and determines the divisor N. An image capturing instruction containing the divisor N thus determined and the exposure time E is then output to the image capturing control unit 11*f*.

The computing unit 31*h* is different from the computing unit 21*h* illustrated in FIG. 10 in that the computing unit 31*h* computes difference images for each of the illumination unit 31*b*A and the illumination unit 31*b*B. Therefore, in the example illustrated in FIG. 14, the computing unit 31*h* establishes four pairs by pairing the OFF image aA1 and the ON image bA1, pairing the OFF image aA2 and the ON image bA2, pairing the OFF image aA3 and the ON image bA3, and pairing the OFF image aA4 and the ON image bA4. The computing unit 31*h* then computes a difference image A1 for the illumination unit 31*b*A by computing pixel value differences between the pixels in the OFF image aA1 and those in the ON image bA1. In the same manner, the computing unit 31*h* computes a difference image A2 from the OFF image aA2 and the ON image bA2, computes a difference image A3 from the OFF image aA3 and the ON image bA3, and computes a difference image A4 from the OFF image aA4 and the ON image bA4.

The computing unit 31*h* also establishes four pairs by paring the OFF image aB1 and the ON image bB1, paring the OFF image aB2 and the ON image bB2, paring the OFF image aB3 and the ON image bB3, and paring the OFF image aB4 and the ON image bB4. The computing unit 31*h* computes a difference image B1 for the illumination unit 31*b*B by computing pixel value differences between the pixels in the OFF image aB1 and those in the ON image bB1. In the same manner, the computing unit 31*h* computes a difference image B2 from the OFF image aB2 and the ON image b2, computes a difference image B3 from the OFF image aB3 and the ON image bB3, and computes a difference image B4 from the OFF image aB4 and the ON image bB4. In this manner, the computing unit 31*h* computes N pieces of difference images for the illumination unit 31*b*A and N pieces of difference images for the illumination unit 31*b*B. The computing unit 31*h* then stores N pieces of difference images for the illumination unit 31*b*A and those for the illumination unit 31*b*B in an image storage unit 31*e*.

The integrating unit 31*j* is different from the integrating unit 31*j* illustrated in FIG. 10 in that the integrating unit 31*j* generates an integrated image for each of the illumination unit 31*b*A and the illumination unit 31*b*B.

Furthermore, the image capturing apparatus 31 also includes the measuring unit 31*k* and the information storage unit 31*m*. Among these units, the measuring unit 31*k* is a processing unit that measures the intensity of external light. As a possible implementation, the measuring unit 31*k* measures an output current acquired by the generation of an electromotive force resulting from the photovoltaic effect achieved when the measuring unit 31*k* is illuminated with the light from the illumination, as an index of the external light intensity. The optimal exposure time differs depending on the illumination, because the light intensity of the illumination and the sensitivity of the image sensor vary depending on the wavelength of the illumination. Furthermore, saturation is more likely to be produced from an illumination with a long optimal exposure time than one with a short optimal exposure time. Therefore, in order to suppress saturation, the measuring unit 31*k* sets the wavelength of the light to be measured to the wavelength of the light whose optimal exposure time is the longest. An example of a possible implementation of the measuring unit 31*k* includes a detector such as a photodiode or a phototransistor.

The information storage unit 31*m* is a storage device storing therein information in which an intensity of the external light is associated with a divisor. As an example, the information storage unit 31*m* stores therein information in which an output current measured with the measuring unit 31*k* is associated with a divisor in advance. As an example, to the information in which an intensity of the external light is associated with a divisor, values acquired through experiments or the like are set in advance. In the example illustrated in FIG. 15, this information is information having a table format in which a divisor corresponding to an output current range is set in the same row as the output current range. As another example, the information storage unit 31*m* is accessed, when an output current is measured with the measuring unit 31*k*, to read the information of the divisor corresponding to the output current thus measured.

Configuration of Determination Apparatus 32

A functional configuration of the determination apparatus 32 according to the third embodiment will now be explained. The determination apparatus 32 illustrated in FIG. 13 includes a communicating unit 32*a* and a storage unit 32*b*, instead of the communicating unit 22*a*, and the storage unit 22*b* included in the authentication apparatus 22 illustrated in FIG. 10.

Because the communicating unit 32*a* and the storage unit 32*b* have basic functions that are the same as those of the respective functional units illustrated in FIG. 10, only the differences are explained hereunder.

Among these units, the communicating unit 32*a* transmits and receives different types of data to and from other apparatuses including the image capturing apparatus 31, from those transmitted and received by the communicating unit 22*a* illustrated in FIG. 10. For example, the communicating unit 32*a* receives an integrated image for the illumination unit 31*b*A and an integrated image for the illumination unit 31*b*B from the image capturing apparatus 31.

The storage unit 32*b* stores therein different types of data from those stored in the storage unit 22*b* illustrated in FIG. 10. As described earlier, in the third embodiment, the image capturing apparatus 31 transfers an integrated image for the illumination unit 31*b*A and the integrated image for the illumination unit 31*b*B to the determination apparatus 32. Therefore, as an example, when the integrated image for the illumination unit 31*b*A and the integrated image for the illumination unit 31*b*B are received from the image capturing apparatus 31, the storage unit 32*b* stores therein the integrated image for the illumination unit 31*b*A and the integrated image for the illumination unit 31*b*B. As another example, when a material determination is performed, the storage unit 32*b* is accessed by a determination unit 32*c*, which will be described later, making a reference to the integrated image for the illumination unit 31*b*A and the integrated image for the illumination unit 31*b*B.

Figure 16:
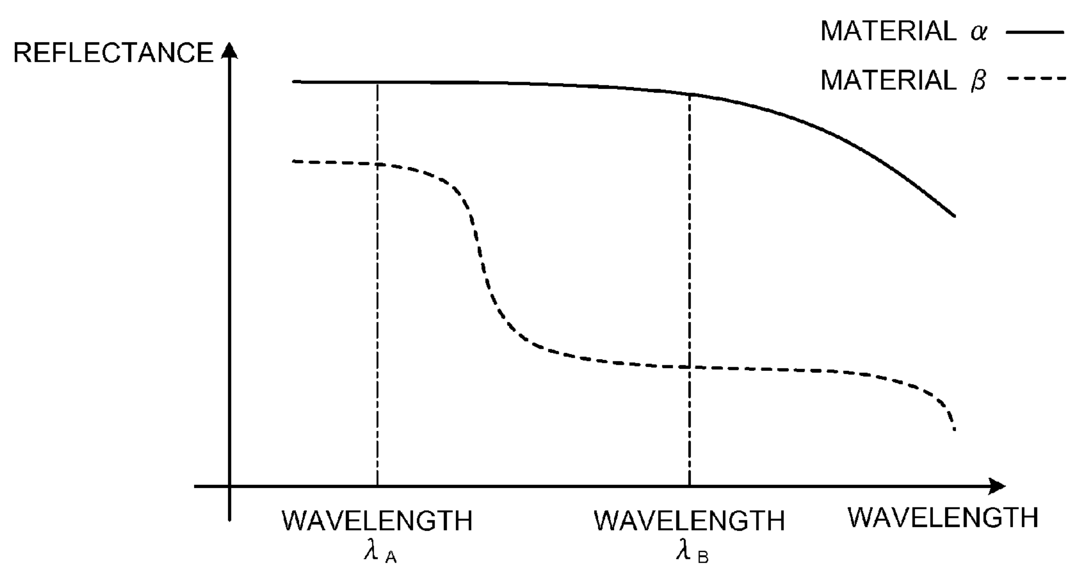
FIG. 16 is a graph illustrating an example of a relation between a wavelength and reflectance of different materials.

The determination apparatus 32 further includes the determination unit 32*c*. The determination unit 32*c* is a processing unit that determines the material of an object, using the integrated images generated by the image capturing apparatus 31. As a possible implementation, the determination unit 32*c* determines the material of an object by computing luminance ratio between the luminance in an image A that is an integrated image for the illumination unit 31*b*A and that in an image B that is an integrated image for the illumination unit 31*b*B. FIG. 16 is a graph illustrating an example of a relation between a wavelength and reflectance of different materials. As illustrated in FIG. 16, reflectance of a material differs depending on the wavelength of the illuminating light. Therefore, the material of an object can be determined by comparing the luminance in an image captured when the object is illuminated with the light from the illumination unit 31*b*A at a wavelength $\lambda_A$ and another image captured when the object is illuminated with the illumination unit 31*b*B at a wavelength $\lambda_B$. For example, the determination unit 32*c* sets a determined area D to the integrated images generated by the image capturing apparatus 31. The determination unit 32*c* then computes $R(x, y)=IA(x, y)/IB(x, y)$, which is the ratio between luminance $IA(x, y)$ at coordinates $(x, y)$ in the image A and luminance $IB(x, y)$ at the coordinates $(x, y)$ in the image B, for every point $P(x, y)$ in the determined area D. The determination unit 32*c* then determines if the luminance ratio $R(x, y)$ between the image A and the image B thus computed is lower than the predetermined threshold. If $R(x, y)$ is lower than the predetermined threshold, the determination unit 32*c* determines that the object is made of material $\alpha$. If $R(x, y)$ is equal to or higher than the predetermined threshold, the determination unit 32*c* determines that the object is made of material $\beta$.

Sequence of Processes

The sequence of processes performed by the material determining system 30 according to the third embodiment will now be explained. In this section, (1) a determining process performed by the material determining system 30 will be explained to begin with, and (2) a divisor determining process and (3) an image capturing process included in the determining process will then be explained in detail.

(1) Determining Process

Figure 17:
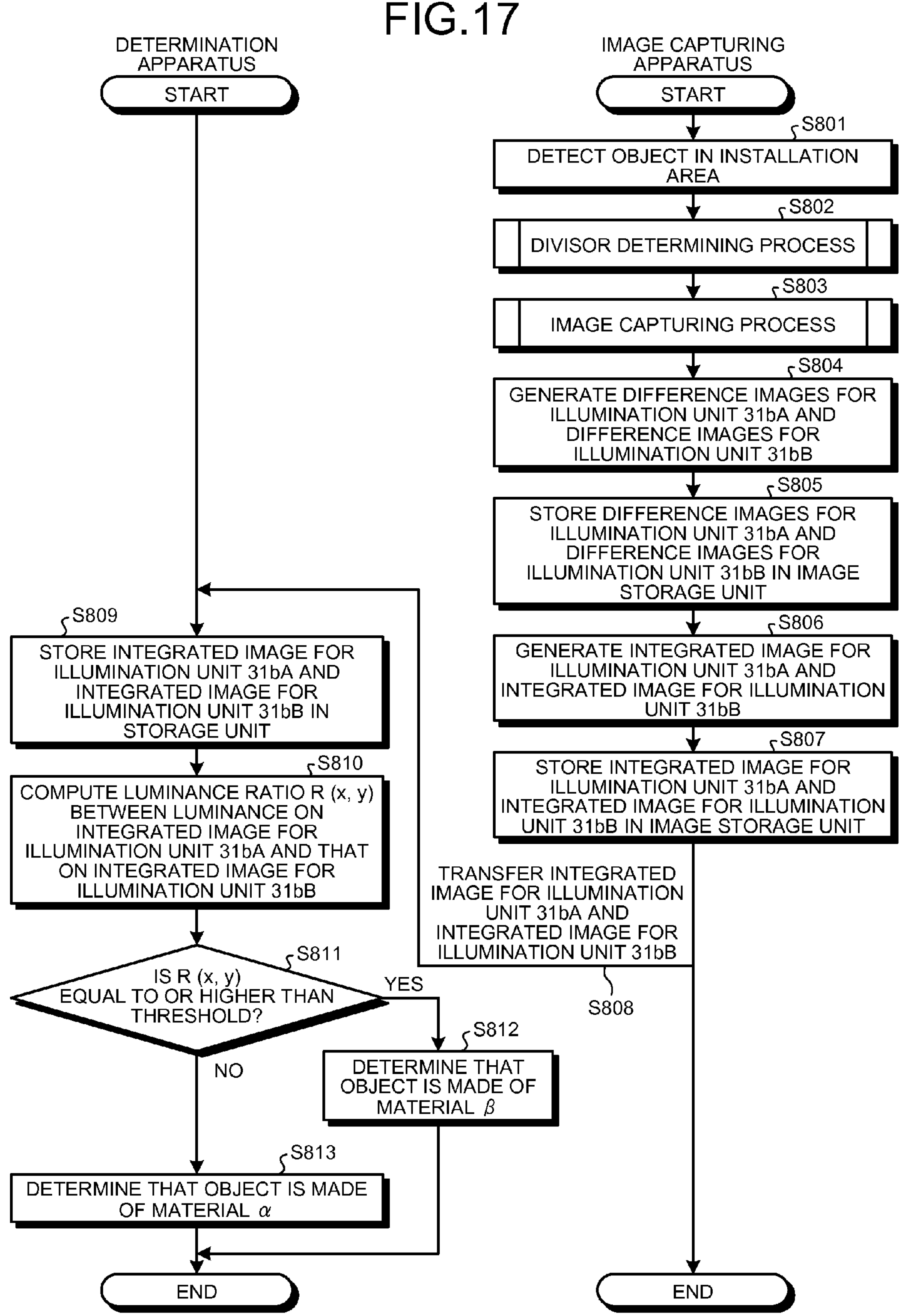
FIG. 17 is a flowchart illustrating a determining process according to the third embodiment.

FIG. 17 is a flowchart illustrating the determining process according to the third embodiment. The determining process is initiated when the sensor unit 31*a* detects an object in the installation area. As illustrated in FIG. 17, when the sensor unit 31*a* detects an object in the installation area (Step S801), the determining unit 31*g* executes the "divisor determining process" for determining the divisor N by which the exposure time E is divided (Step S802).

The image capturing control unit 31*f* captures N pieces of OFF images, N/2 pieces of ON images with the illumination unit 31*b*A, and N pieces of ON images with the illumination unit 31*b*B in the order described herein, based on the image capturing instruction containing image capturing parameters including the divisor N determined by the determining unit 31*g*. The image capturing control unit 31*f* then captures N/2 pieces of ON images with the illumination unit 31*b*A and N pieces of OFF images in the order described herein. In this manner, the image capturing control unit 31*f* performs the "image capturing process" in which 2*N pieces of OFF images, N pieces of ON images with the illumination unit 31*b*A, and N pieces of ON images with the illumination unit 31*b*B are captured (Step S803).

The computing unit 31*h* then determines N pairs of an OFF image and an ON image with the illumination unit 31*b*A, and N pairs of an OFF image and an ON image with the illumination unit 31*b*B. The computing unit 31*h* then computes N pieces of difference images from the respective pairs of an OFF image and an ON image for each of the illumination unit 31*b*A and the illumination unit 31*b*B (Step S804). The computing unit 31*h* stores the N pieces of difference images for each of the illumination unit 31*b*A and the illumination unit 31*b*B computed at Step S804 in the image storage unit 31*e* (Step S805).

The integrating unit 31*j* then acquires the sum of the pixel values across the N pieces of difference images for each of the illumination unit 31*b*A and the illumination unit 31*b*, stored in the image storage unit 31*e*. In this manner, the integrating unit 31*j* generates a single piece of integrated image for the illumination unit 31*b*A and a single piece of integrated image for the illumination unit 31*b*B, from the N pieces of difference images for the illumination unit 31*b*A and the N pieces of difference images for the illumination unit 31*b*B, respectively (Step S806). The integrating unit 31*j* then stores the integrated images generated at Step S806 in the image storage unit 31*e* (Step S807). The image capturing apparatus 31 transfers the integrated image for the illumination unit 31*b*A and the integrated image for the illumination unit 31*b*B to the determination apparatus 32 via the communicating unit 31*d* (Step S808).

The determination apparatus 32 stores the integrated image for the illumination unit 31*b*A and the integrated image for the illumination unit 31*b*B in the storage unit 32*b* (Step S809). The determination unit 32*c* then computes a luminance ratio R from the integrated image for the illumination unit 31*b*A and the integrated image for the illumination unit 31*b*B stored at Step S809 in the storage unit 32*b* (Step S810).

If the luminance ratio R is equal to or higher than the predetermined threshold (Yes at Step S811), the determination unit 32*c* determines that the object is made of a material β (Step S812), and the process is ended. If the luminance ratio R is lower than the predetermined threshold (No at Step S811), the determination unit 32*c* determines that the object is made of a material α (Step S813), and the process is ended.

(2) Divisor Determining Process

Figure 18:
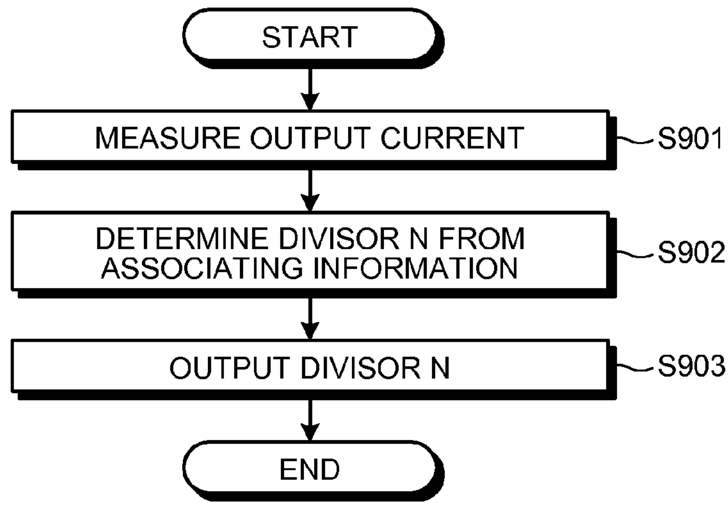
FIG. 18 is a flowchart illustrating a divisor determining process according to the third embodiment.

FIG. 18 is a flowchart illustrating a divisor determining process according to the third embodiment. This process is initiated when the process at Step S801 is executed in the determining process illustrated in FIG. 17, in other words, when the sensor unit 31*a* detects an object.

As illustrated in FIG. 18, the measuring unit 31*k* measures the output current (Step S901). The determining unit 31*g* then determines the divisor N from the output current measured with the measuring unit by referring to the associating information that is the information in which an output current is associated with a divisor (Step S902). The determining unit 31*g* then outputs an image capturing instruction containing the divisor N thus determined to the image capturing control unit 31*f* (Step S903), and the process is ended.

(3) Image Capturing Process

Figure 19:
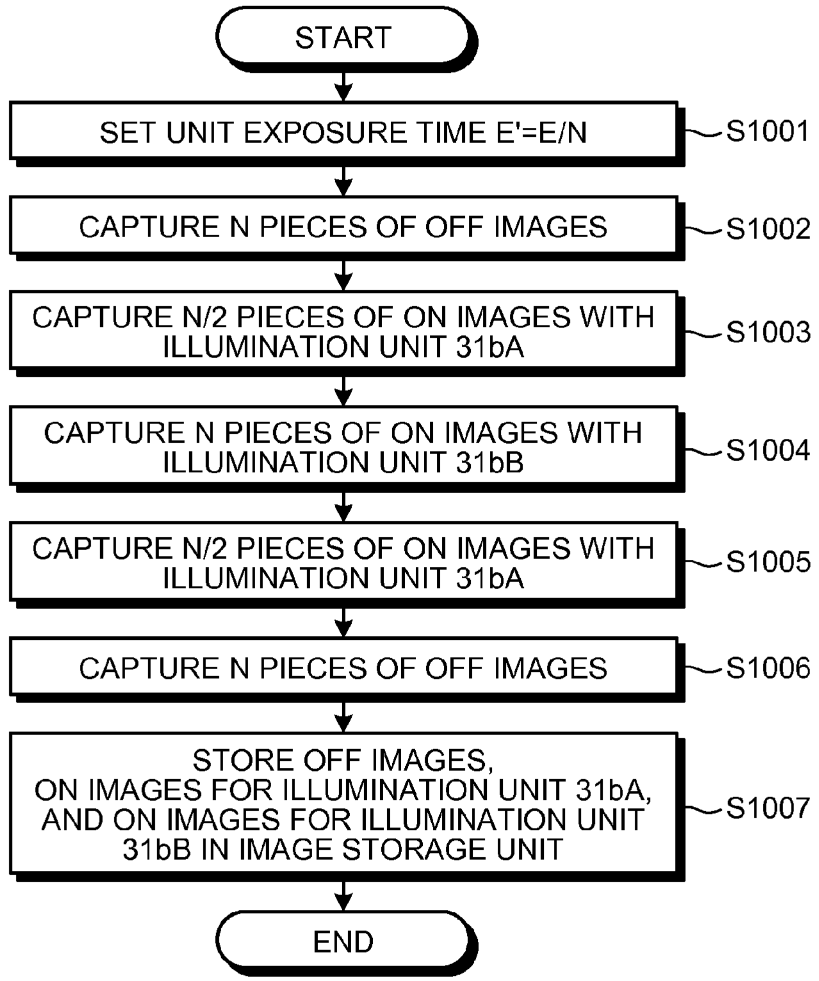
FIG. 19 is a flowchart illustrating an image capturing process according to the third embodiment.

FIG. 19 is a flowchart illustrating the image capturing process according to the third embodiment. This image capturing process is initiated when an image capturing instruction is received from the determining unit 31*g*.

As illustrated in FIG. 19, the image capturing control unit 31*f* computes the unit exposure time E' representing an exposure time for a single piece of image, by dividing the exposure time E by the divisor N (Step S1001).

The image capturing control unit 31*f* then turns OFF the illumination unit 31*b*A and the illumination unit 31*b*B, and captures N pieces of OFF images (Step S1002). The image capturing control unit 31*f* then turns ON the illumination unit 31*b*A, keeps the illumination unit 31*b*B OFF, and captures N/2 pieces of ON images with the illumination unit 31*b*A (Step S1003). The image capturing control unit 31*f* then turns OFF the illumination unit 31*b*A, turns ON the illumination unit 31*b*B, and captures N pieces of ON images with the illumination unit 31*b*B (Step S1004). The image capturing control unit 31*f* then turns ON the illumination unit 31*b*A, turns OFF the illumination unit 31*b*B, and captures N/2 pieces of ON images with the illumination unit 31*b*A (Step S1005). The image capturing control unit 31*f* then turns OFF the illumination unit 31*b*A and the illumination unit 31*b*B, and captures N pieces of OFF images (Step S1006).

Finally, the image capturing control unit 31*f* stores the N pieces of OFF images, the N pieces of ON images with the illumination unit 31*b*A, and the N pieces of ON images with the illumination unit 31*b*B acquired through the process at Step S1002 to Step S1006 in the image storage unit 31*e* (Step S1007), and the process is ended.

Advantageous Effects Achieved by Third Embodiment

As described above, the material determining system 30 according to the third embodiment captures OFF images before and after capturing the ON images. Because the material determining system 30 according to the third embodiment can reduce the frequency at which the illumination is switched from ON to OFF or from OFF to ON, the frequency of and the time for null write can be reduced. As a result, idle time for capturing images can be reduced. Hence, the material determining system 30 according to the third embodiment can reduce the image capturing time.

Furthermore, the material determining system 30 according to the third embodiment determines the divisor using an apparatus for measuring an output current and information in which an output current is associated with a divisor. Therefore, with the material determining system 30 according to the third embodiment, because the process for determining the divisor can be simplified, the image capturing time can be reduced. As an example, because capturing of ON images for determining the divisor and the computation of the external light evaluation value can be omitted, the image capturing time can be reduced. As another example, because when the external light is lower than the predetermined threshold, the process of computing the difference images and the process of generating the integrated image can be omitted by setting the divisor to zero, the image capturing time can be reduced.

Furthermore, in the material determining system 30 according to the third embodiment, because the image capturing time is reduced, extension in the image capturing time can be suppressed, even when used is an image sensor capturing images at a low rate and a long interval. Because an inexpensive image sensor can be used, costs can be reduced.

Furthermore, because the ON images are captured continuously at the center of the image capturing sequence, the influence of the variations in the external light and the subject can be reduced. This is because an ON image has higher luminance, an ON image is more influenced by such variations than an OFF image. By capturing the ON images continuously at the center of the image capturing sequence, the influence of such variations can be further reduced.

Furthermore, because the material determining system 30 according to the third embodiment determines the divisor based on an illumination whose optimal exposure time is the longest, saturation can be suppressed. Therefore, the determination accuracy can be improved.

Furthermore, in the material determining system 30 according to the third embodiment, capturing of images with the illumination whose optimal exposure time is the longest is positioned at the center of the image capturing sequence. In the material determining system 30 according to the third embodiment, because capturing of images with the largest amount of information is positioned at the center of the image capturing sequence, the influence of variations such as positional changes in the object or changes in the external light intensity can be reduced.

[d] Fourth Embodiment

Some embodiments related to the apparatuses according to the present invention are described so far, but the present invention may be implemented in various forms other than those disclosed in the embodiments. Other embodiments included in the present invention will now be explained.

Types of Subject to be Authenticated

Explained in the second embodiment is an example in which a face authentication is performed as a biometric authentication. However, the authenticated region is not limited to a face, but other biometric information such as a fingerprint or a palm vein may be used. For example, in the palm vein authentication, a palm that is the subject is irradiated with an illumination having a high transmittance to a human body, and an image capturing apparatus is caused to capture a reflected light. The person is then authenticated using a subdermal vein pattern captured by the image capturing apparatus as characteristics to be authenticated. Because a palm vein authentication uses a vein pattern that is usually invisible to human eyes in the authentication, the risk of leakage of characteristics to be authenticated is low. Therefore, such a palm vein authentication can be used as a personal authentication technology mainly in high-security fields, such as in a bank automatic tellers machine (ATM). Furthermore, because a palm vein authentication is a non-contact authentication not allowing the subject to touch the sensor, the user is forced to hold his/her hand over the sensor for a longer time when the image capturing time is extended. Therefore, the convenience can be improved by reducing the image capturing time.

Parallel Processing of Image Generation

Used in the example explained in the second embodiment and the third embodiment is an approach in which the OFF images and ON images, the difference images, and the integrated image are generated sequentially. However, an approach in which these images are generated in parallel may also be used. For example, the process of generating the difference image may be initiated once a single piece of OFF image and a single piece of ON image are generated, and the process of integrating the difference images for generating an integrated image may be initiated sequentially every time two pieces of difference images are generated. In this manner, generation of the OFF image and the ON image, generation of the difference image, and generation of the integrated image can be performed in parallel, without waiting for each of these processes of image generation to be completed. In this manner, the image capturing time can be reduced.

Exemplary Alternative of Divisor Determining Process

Used in the example explained in the first to the third embodiments is an approach in which the divisor is determined by capturing ON images for determining the divisor, in addition to the ON images used in computing difference images. However, the ON images used in computing the difference images may also be used in determining the divisor. For example, the N pieces of ON images captured after the N/2 pieces of OFF images are captured may be used as the ON images for determining the divisor.

Figure 20:
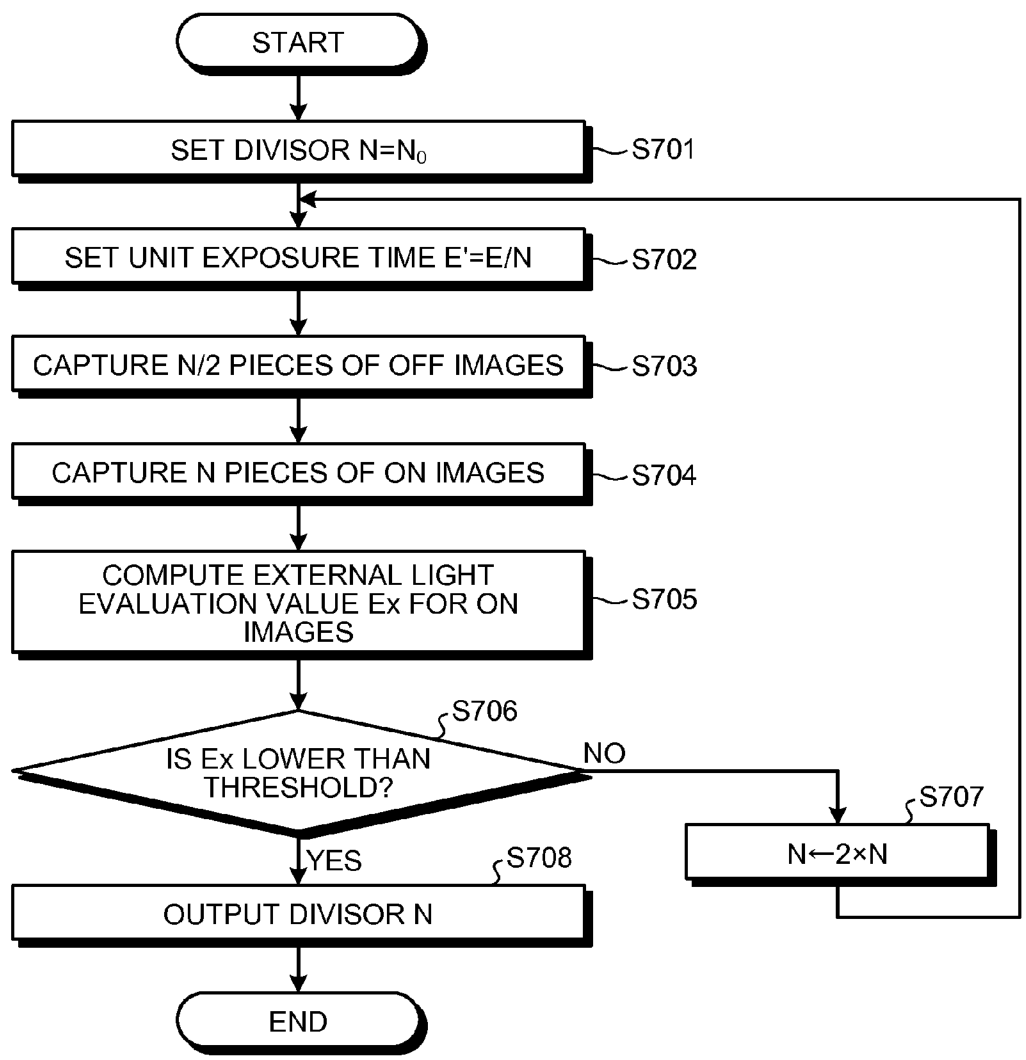
FIG. 20 is a flowchart illustrating an example of a divisor determining process.

FIG. 20 is a flowchart illustrating an example of such a divisor determining process. Explained hereunder is an example the second embodiment is applied with an approach in which the divisor is determined using the ON images that are used in computing difference images. The divisor determining process illustrated in FIG. 20 is initiated when a user is detected in the pass-through area of the gate, as illustrated in FIG. 12. As illustrated in FIG. 20, the determining unit 21*g* sets the initial value $N_0$ to the divisor N (Step S701). The determining unit 21*g* then sets the unit exposure time E' to E/N that is computed from the exposure time E and the divisor N (Step S702).

The determining unit 21*g* then causes the image capturing control unit 21*f* to capture N/2 pieces of OFF images based on the unit exposure time E' (Step S703). The determining unit 21*g* then causes the image capturing control unit 21*f* to capture N pieces of ON images (Step S704). The determining unit 21*g* computes the external light evaluation value Ex from the ON images captured at Step S704 (Step S705). The determining unit 21*g* determines if the external light evaluation value Ex is lower than predetermined threshold Th (Step S706).

If the external light evaluation value Ex is equal to or higher than the predetermined threshold Th (No at Step S706), the determining unit 21*g* updates the divisor N to a value larger than the previous value, e.g., a value twice the previous divisor (Step S707). The system control then goes to Step S702, and the determining unit 21*g* repeats the process of updating the divisor, setting a unit exposure time E', capturing OFF images, capturing ON images, and computing the external light evaluation value Ex, until the external light evaluation value Ex reaches a value lower than the threshold Th. If the external light evaluation value Ex is lower than predetermined threshold Th (Yes at Step S706), the determining unit 21*g* outputs the divisor N used at Step S701 or at Step S707 to the image capturing control unit 21*f* (Step S708), and the process is ended. Once the divisor determining process is completed, the image capturing apparatus 21 performs the process at Step S605 and thereafter illustrated in FIG. 12.

At this time, because the divisor is determined using the N pieces of ON images captured by the image capturing control unit 21*f* used in computing difference images, capturing of ON images for determining the divisor, which are images not used in computing difference images, is not required. Therefore, the number of times the ON images are captured is reduced. Thus, the image capturing time can be reduced.

Explained above is an example in which the second embodiment is applied with an approach in which the divisor is determined using the ON images used in computing difference images. However, such an approach may be applied to the first embodiment or the third embodiment, without limitation to the second embodiment.

Continuous Capturing

Figure 21:
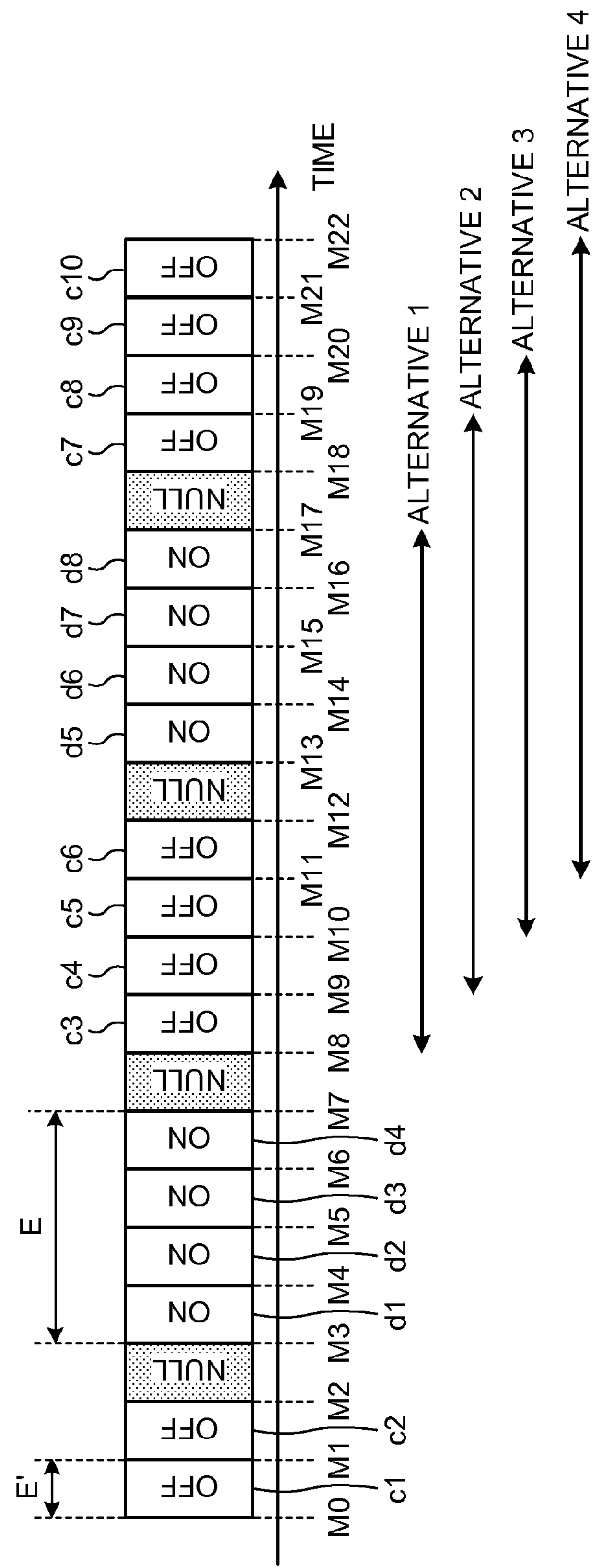
FIG. 21 is a schematic of an example of an image capturing sequence.

Used in the example explained in the first to the third embodiments is an approach in which the N pieces of OFF images and the N pieces of ON images are captured. However, the N pieces of OFF images and the N pieces of ON images may be captured continuously. FIG. 21 is a schematic of an example of such an image capturing sequence. Illustrated in FIG. 21 is an example of an image capturing sequence in which images are captured repeatedly when the divisor N is "4". Explained hereunder is an example in which the continuous capturing is applied to the second embodiment. As illustrated in FIG. 21, the image capturing control unit 21*f* keeps the illumination unit 21*b* OFF during a period from time M0 to time M2, and closes the shutter temporarily at time M1. The image capturing control unit 21*f* then causes the image storage unit 21*e* to store therein an OFF image c1 acquired through the exposure over a period from "M0 to M1", and causes the image storage unit 21*e* to store therein an OFF image c2 acquired through the exposure over a period "M1 to M2". The image capturing control unit 21*f* then switches the illumination unit 21*b* from OFF to ON at time M2. At this time, certain time is taken to complete switching from OFF to ON. Therefore, assuming that switching from OFF to ON takes time from time M2 to time M3, the image capturing control unit 21*f* performs null write to the image storage unit 21*e* for an image acquired through the exposure over a period "M2 to M3". Null is thus stored because any image acquired before switching to ON or OFF is completed is not used in the authentication.

The image capturing control unit 21*f* then keeps the illumination unit ON for a period from time M3 to time M7, and closes the shutter temporarily at time M4, time M5, and time M6. As a result, the ON image d1 acquired through the exposure over a period from "M3 to M4", the ON image d2 acquired through the exposure over a period from "M4 to M5", the ON image d3 acquired through the exposure over a period from "M5 to M6", and the ON image d4 acquired through the exposure over a period from "M6 to M7" are stored in the image storage unit 21*e* in the order described herein. The image capturing control unit 21*f* switches the illumination unit 21*b* from ON to OFF at time M7. The image capturing control unit 21*f* performs null write to the image storage unit 21*e* for an image acquired through the exposure over a period from "M7 to M8". The image capturing control unit 21*f* keeps the illumination unit 21*b* OFF for a period from time M8 to time M10, and closes the shutter temporarily at time M9 and time M10. After causing the image storage unit 21*e* to read an OFF image c3 acquired through the exposure over a period "M8 to M9", the image capturing control unit 21*f* causes the image storage unit 21*e* to store therein an OFF image c4 acquired through the exposure over a period "M9 to M10". This process is repeated until an image capturing ending instruction is received. Once N pieces of OFF images and N pieces of ON images are stored in the image storage unit 21*e*, the image capturing control unit 21*f* instructs the computing unit 21*h*, which will be described later, to compute difference images.

In the example explained above, the continuous capturing is applied to the second embodiment. However, the continuous capturing may be applied to the first embodiment or the third embodiment, without limitation to the second embodiment.

In this example, if it is determined that an OFF images used in computing the previous difference image or to be used in computing the subsequent difference image is captured under similar conditions to those under which the ON image to be used in computing the current difference image is captured than those under which the OFF image to be used in computing the current difference image is captured, the computing unit may compute the current difference image using the OFF image used in computing the previous difference image or to be used in computing the subsequent difference image.

For example, to explain using the example illustrated in FIG. 21, when the difference images are to be computed using the ON images d5 to d8, the computing unit may compute the difference images by pairing these ON images with the OFF images c3 to c6 (the alternative 1 in FIG. 21), with the OFF images c4 to c7 (the alternative 2 in FIG. 21), with the OFF images c5 to c8 (the alternative 3 in FIG. 21), or with the OFF images c6 to c9 (the alternative 4 in FIG. 21). Specifically, for example, for the alternative 2 in FIG. 21, the computing unit establishes tour pairs by pairing the OFF image c4 and the ON image d5, pairing the OFF image c5 and the ON image d6, pairing the OFF image c6 and the ON image d7, and pairing the OFF image c7 and the ON image d8. The computing unit then computes a difference image cd1 by computing pixel value differences between the pixels in the OFF image c4 and those in the ON image d5. In the same manner, the computing unit computes a difference image cd2 from the OFF image c5 and the ON image d6, computes a difference image cd3 from the OFF image c6 and the ON image d7, and computes a difference image cd4 from the OFF image c7 and the ON image d8. In this manner, by pairing an ON image with an OFF image used in computing the previous difference image or an OFF image to be used in computing the subsequent difference image, an ON image can be paired with an OFF image captured under similar conditions as those under which the ON image is captured. In this manner, the influence of positional changes in the subject or changes in the external light intensity can be reduced.

Material Determination Using Illumination with Different Distribution Profile

Explained in the third embodiment is an example in which illuminations at different wavelengths are used. Alternatively, an illumination with a different distribution profile may be used. For example, an illumination provided with a lens may be used so that the subject is irradiated with a spot light converged by the lens. Use of a spot light for irradiating the subject enables the distance to the subject to be measured. Therefore, the determination accuracy can be improved.

Image Capturing Program

The various processes explained in the embodiments may be realized by causing a computer such as a personal computer or a workstation to execute a computer program prepared in advance. Explained now with reference to FIG. 22 is an example in which a computer executing an image capturing program having the same functions as those described in the embodiments.

Figure 22:
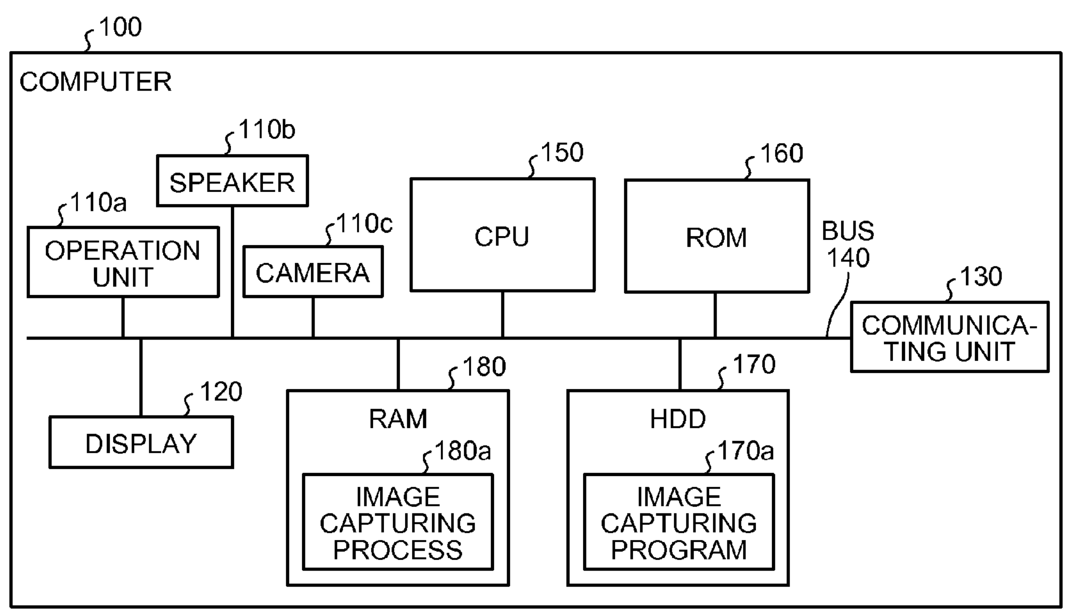
FIG. 22 is a schematic for explaining an example of a computer for executing an image capturing program according to the first to the third embodiments.

FIG. 22 is a schematic for explaining an example of a computer for executing an image capturing program according to the first to the third embodiments. As illustrated in FIG. 22, this computer 100 includes an operation unit 110*a*, a speaker 110*b*, a camera 110*c*, a display 120, and a communicating unit 130. The computer 100 also includes a CPU 150, a read-only memory (ROM) 160, a hard-disk drive (HDD) 170, and a random access memory (RAM) 180. These units are connected via a bus 140.

An image capturing program 1708 achieving the same functions as those of the image capturing control unit 11*f*, the determining unit 12*d*, the computing unit 12*e*, the integrating unit 12*f*, and the authenticating unit 12*g* described in the first embodiment is stored in advance in the HDD 170, as illustrated in FIG. 22. The functions achieved by the image capturing program 170*a* may be integrated or separated as appropriate, in the same manner as each of the image capturing control unit 11*f*, the determining unit 12*d*, the computing unit 12*e*, the integrating unit 12*f* and the authenticating unit 12*g* illustrated in FIG. 1. Furthermore, the functions achieved by the image capturing program 170*a* may be integrated or separated as appropriate, in the same manner as the image capturing control unit 21*f*, the determining unit 21*g*, the computing unit 21*h*, the integrating unit 21*j*, and the authenticating unit 22*h* illustrated in FIG. 10. Furthermore, the functions achieved by the image capturing program 170*a* may be integrated or separated as appropriate, in the same manner as the image capturing control unit 31*f*, the determining unit 31*g*, the computing unit 31*h*, the integrating unit 31*j*, and the determination unit 32*c* illustrated in FIG. 13. In other words, all data to be stored in the HDD 170 does not always need to be stored in the HDD 170, and only data to be used for the processes may be stored in the HDD 170.

The CPU 150 then reads the image capturing program 170*a* from the HDD 170, and loads the program onto the RAM 180. In this manner, the image capturing program 170*a* functions as an image capturing process 180*a*, as illustrated in FIG. 22. The image capturing process 180*a* loads various types of data read from the HDD 170 onto an area assigned to the image capturing process 180*a* on the RAM 180, and executes various processes based on such data thus loaded. The image capturing process 180*a* includes the processes executed by the image capturing control unit 11*f*, the determining unit 12*d*, the computing unit 12*e*, the integrating unit 12*f*, and the authenticating unit 12*g* illustrated in FIG. 1, e.g., the process illustrated in FIG. 7. The image capturing process 180*a* also includes the process executed by the image capturing control unit 21*f*, the determining unit 21*g*, the computing unit 21*h*, the integrating unit 21*j*, and the authenticating unit 22*h* illustrated in FIG. 10, e.g., the process illustrated in FIG. 12. The image capturing process 180*a* also includes the process executed by the image capturing control unit 31*f*, the determining unit 31*g*, the computing unit 31*h*, the integrating unit 31*j*, and the determination unit 32*c* illustrated in FIG. 13, e.g., the process illustrated in FIG. 17. Not all of the processing units that are virtually realized on the CPU 150 do not always need to be operating on the CPU 150, and only the processing units to be used for the process may be virtually realized on the CPU 150.

The image capturing program 170*a* does not necessarily need to be stored in the HDD 170 or in the ROM 160 in advance. For example, each of these computer programs may be stored in a "portable physical medium" inserted into the computer 100 such as a flexible disk (FD), a compact disk read-only memory (CD-ROM), a digital versatile disk (DVD), a magneto-optical disk, or an integrated circuit (IC) card, and the computer 100 then may acquire each of the computer programs from the portable physical medium, and execute the computer program. Alternatively, each of the computer programs may be stored in another computer or a server connected to the computer 100 over a public circuit, the Internet, a local area network (LAN), or a wide area network (WAN), and the computer 100 may acquire each of the computer programs from the computer or the server, and execute the computer program.

An embodiment of the present invention can reduce an image capturing time.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image capturing method executed by an image capturing apparatus including an illumination that illuminates a subject, the image capturing method comprising:

continuously generating, using a processor, one or more OFF images in which the subject is captured with the illumination turned OFF, for a first number of times;

continuously generating, using the processor, ON images in which the subject is captured with the illumination turned ON, for a second number of times;

continuously generating, using the processor, one or more OFF images in which the subject is captured with the illumination turned OFF, for the first number of times after capturing the ON images;

computing, using the processor, a difference image between each of the generated ON images and an OFF image corresponding to the ON image among the generated OFF images; and integrating, using the processor, the computed difference images, wherein the generating includes turning OFF the illumination and capturing N/2 OFF images before and after N ON images are captured, the N is a divisor by which an exposure time is divided, and the exposure time is a time for which an image sensor is exposed to light that is imaged through a lens.

2. The image capturing method according to claim 1, wherein the second number of times includes double of the first number of times.

3. The image capturing method according to claim 1, wherein, the computing the difference image includes:

determining pairs of an ON image and an OFF image in order of times at which the ON images and the OFF images are generated, and computing the difference image for each of the pairs of the ON image and the OFF image.

4. The image capturing method according to claim 1, further comprising:

computing, from an ON image, an external light evaluation value representing intensity of external light in the ON image; and determining the first number of times and the second number of times based on the external light evaluation value.

5. The image capturing method according to claim 1, wherein the computing the difference image includes computing a current difference image using an OFF image used in computing a previous difference image or an OFF image to be used in computing a subsequent difference image, when it is determined that the OFF image used in computing the previous difference image or the OFF image to be used in computing the subsequent difference image is captured under conditions that the OFF image is more similar to an ON image to be used in computing the current difference image than an OFF image to be used in computing the current difference image.

6. The image capturing method according to claim 1, further comprising determining the first number of times and the second number of times based on a captured image under a condition that a longest exposure time is used, when images are captured under different capturing conditions.

7. The image capturing method according to claim 6, wherein, the determining the first number of times and the second number of times includes determining the first number of times and the second number of times based on the captured image under the condition that the longest exposure time is used, when the capturing conditions include a condition related to a wavelength of the illumination or a distribution profile of the illumination.

8. The image capturing method according to claim 1, wherein the generating the ON images includes, when images are captured under different capturing conditions, generating ON images under a condition that a shorter exposure time is used before and after generating a ON image under a condition that a longest exposure time is used.

9. The image capturing method according to claim 8, wherein, the generating the ON images includes, when the capturing conditions include a condition related to a wavelength of the illumination or a distribution profile of the illumination, generating ON images under the condition that the shorter exposure time is used before and after generating the ON image under the condition that the longest exposure time is used.

10. The image capturing method according to claim 1, further comprising determining the first number of times and the second number of times based on intensity of external light measured with a measuring unit that measures intensity of external light.

11. The image capturing method according to claim 10, wherein, the determining the first number of times and the second number of times includes employing the first number of times and the second number of times corresponding to the intensity of external light measured with the measuring unit from information in which intensities of external light are associated with first numbers of times and second numbers of times.

12. The image capturing method according to claim 1, wherein, the generating the ON image, the generating the OFF image, the computing the difference image, and the integrating the difference images are performed independently.

13. An image capturing apparatus comprising:

a processor; and a memory coupled to the processor, wherein the processor executes a process comprising:

continuously capturing one or more OFF images in which a subject is captured with an illumination illuminating the subject turned OFF, for a first number of times;

continuously capturing ON images in which the subject is captured with the illumination turned ON, for a second number of times after capturing the one or more OFF images;

continuously capturing one or more OFF images in which the subject is captured with the illumination turned OFF, for the first number of times after capturing the ON images;

computing a difference image between each of the captured ON images and an OFF image corresponding to the ON image among the captured OFF images; and integrating the computed difference images, wherein the capturing includes turning OFF the illumination and capturing N/2 OFF images before and after N ON images are captured, the N is a divisor by which an exposure time is divided, and the exposure time is a time for which an image sensor is exposed to light that is imaged through a lens.

14. A non-transitory computer readable storage medium having stored therein an image capturing program that causes a computer to execute a process comprising:

continuously capturing one or more OFF images in which a subject is captured with an illumination illuminating the subject turned OFF, for a first number of times;

continuously capturing ON images in which the subject is captured with the illumination turned ON, for a second number of times after capturing the one or more OFF images;

continuously capturing one or more OFF images in which the subject is captured with the illumination turned OFF, for the first number of times after capturing the ON images;

computing a difference image between each of the captured ON images and an OFF image corresponding to the ON image among the captured OFF images; and integrating the computed difference images, wherein the capturing includes turning OFF the illumination and capturing N/2 OFF images before and after N ON images are captured, the N is a divisor by which an exposure time is divided, and the exposure time is a time for which an image sensor is exposed to light that is imaged through a lens.

* * * * *